United States Patent
Popescu et al.

(10) Patent No.: US 12,010,571 B2
(45) Date of Patent: Jun. 11, 2024

(54) SPECTRAL EFFICIENCY PREDICTION WITH ARTIFICIAL INTELLIGENCE FOR ENHANCING CARRIER AGGREGATION AND PROACTIVE RADIO RESOURCE MANAGEMENT

(71) Applicant: Nokia Technologies Oy, Espoo (FI)

(72) Inventors: Dalia-Georgiana Popescu, Paris (FR); Anand Bedekar, Glenview, IL (US)

(73) Assignee: Nokia Technologies Oy, Espoo (FI)

( * ) Notice: Subject to any disclaimer, the term of this patent is extended or adjusted under 35 U.S.C. 154(b) by 246 days.

(21) Appl. No.: 17/488,860

(22) Filed: Sep. 29, 2021

(65) Prior Publication Data

US 2023/0099006 A1    Mar. 30, 2023

(51) Int. Cl.
*H04W 36/00* (2009.01)
*H04W 24/10* (2009.01)
*H04W 72/542* (2023.01)
*G06N 20/00* (2019.01)

(52) U.S. Cl.
CPC ....... *H04W 36/0085* (2018.08); *H04W 24/10* (2013.01); *H04W 72/542* (2023.01); *G06N 20/00* (2019.01)

(58) Field of Classification Search
CPC . H04W 16/22; H04W 24/10; H04W 36/0069; H04W 36/0085; H04W 36/08; H04W 48/20; H04W 72/542
See application file for complete search history.

(56) References Cited

U.S. PATENT DOCUMENTS

| | | | |
|---|---|---|---|
| 10,051,594 B1 * | 8/2018 | Ramamurthy | G06N 20/00 |
| 10,673,546 B2 | 6/2020 | Bedekar | |
| 2017/0055190 A1 * | 2/2017 | Takano | H04L 5/0051 |
| 2020/0106536 A1 * | 4/2020 | Bedekar | H04W 48/20 |
| 2021/0321226 A1 * | 10/2021 | Zhang | H04L 1/1861 |
| 2022/0386220 A1 * | 12/2022 | Vivanco | H04W 72/542 |
| 2023/0010095 A1 * | 1/2023 | Alabbasi | G06F 9/54 |
| 2023/0098488 A1 * | 3/2023 | Li | H04W 36/08 370/331 |
| 2023/0120578 A1 * | 4/2023 | Khoshnevisan | H04L 5/0053 370/329 |
| 2023/0180123 A1 * | 6/2023 | Vandikas | H04W 16/22 370/311 |
| 2023/0189022 A1 * | 6/2023 | Ramachandra | H04W 36/0069 370/329 |
| 2023/0276263 A1 * | 8/2023 | Rydén | H04W 24/02 455/414.1 |

* cited by examiner

*Primary Examiner* — Michael Thier
*Assistant Examiner* — Prince A Mensah
(74) *Attorney, Agent, or Firm* — Joseph C. Drish; Harrington & Smith

(57) ABSTRACT

An apparatus includes at least one processor; and at least one non-transitory memory including computer program code; wherein the at least one memory and the computer program code are configured to, with the at least one processor, cause the apparatus at least to: transmit an indication of a transformation function to a user equipment, wherein at least one input to the transformation function comprises a location of a user equipment and at least one measurement of a radio channel; receive a representation from the user equipment, the representation being a result of a calculation using the transformation function and the at least one input to the transformation function; and determine, using the representation, a channel quality of at least one secondary cell.

16 Claims, 13 Drawing Sheets

SPECTRAL EFFICIENCY PREDICTION WITH ARTIFICIAL INTELLIGENCE FOR ENHANCING CARRIER AGGREGATION AND PROACTIVE RADIO RESOURCE MANAGEMENT

TECHNICAL FIELD

The examples and non-limiting embodiments relate generally to communications and, more particularly, to spectral efficiency prediction with artificial intelligence for enhancing carrier aggregation and proactive radio resource management.

BACKGROUND

It is known to implement carrier aggregation in a communication network.

SUMMARY

In accordance with an aspect, an apparatus includes at least one processor; and at least one non-transitory memory including computer program code; wherein the at least one memory and the computer program code are configured to, with the at least one processor, cause the apparatus at least to: transmit an indication of a transformation function to a user equipment, wherein at least one input to the transformation function comprises a location of a user equipment and at least one measurement of a radio channel; receive a representation from the user equipment, the representation being a result of a calculation using the transformation function and the at least one input to the transformation function; and determine, using the representation, a channel quality of at least one secondary cell.

In accordance with an aspect, an apparatus includes at least one processor; and at least one non-transitory memory including computer program code; wherein the at least one memory and the computer program code are configured to, with the at least one processor, cause the apparatus at least to: receive an indication of a transformation function from a radio access network, wherein at least one input to the transformation function comprises a location of a user equipment and at least one measurement of a radio channel; perform a measurement of the radio channel to obtain the at least one measurement to be used as the at least one input to the transformation function; obtain the location of the user equipment that is to be used as the at least one input to the transformation function; calculate a representation using the transformation function and the at least one input to the transformation function; and transmit the representation to the radio access network.

In accordance with an aspect, a method includes receiving an indication of a transformation function from a radio access network, wherein at least one input to the transformation function comprises a location of a user equipment and at least one measurement of a radio channel; performing a measurement of the radio channel to obtain the at least one measurement to be used as the at least one input to the transformation function; obtaining the location of the user equipment that is to be used as the at least one input to the transformation function; calculating a representation using the transformation function and the at least one input to the transformation function; and transmitting the representation to the radio access network.

BRIEF DESCRIPTION OF THE DRAWINGS

The foregoing aspects and other features are explained in the following description, taken in connection with the accompanying drawings.

DETAILED DESCRIPTION OF EXAMPLE EMBODIMENTS

Figure 1:
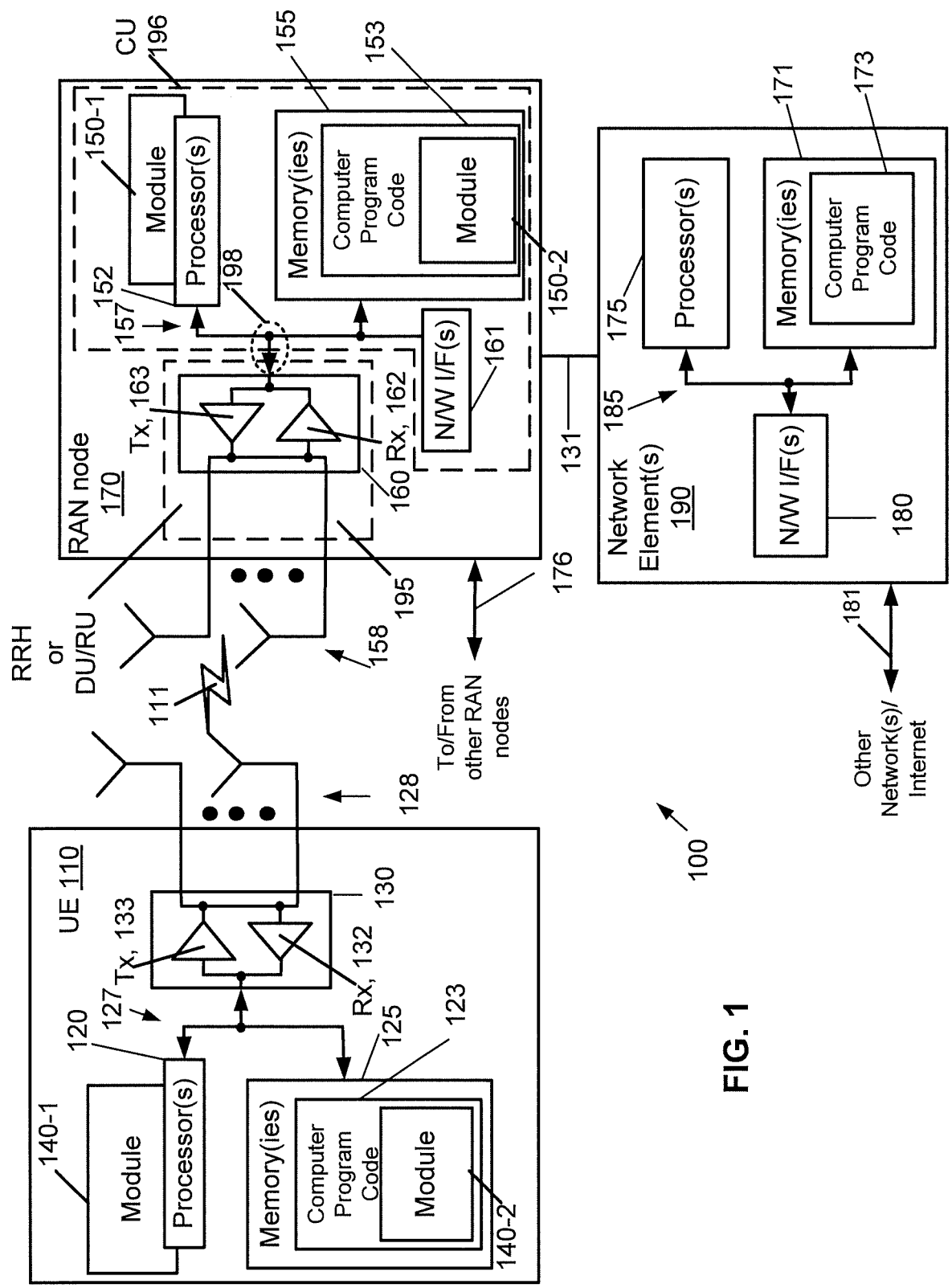
FIG. 1 is a block diagram of one possible and non-limiting system in which the example embodiments may be practiced.

Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface (such as connection 131) to a 5GC (such as, for example, the network element(s) 190). The ng-eNB is a node providing E-UTRA user plane and control plane protocol terminations towards the UE, and connected via the NG interface (such as connection 131) to the 5GC. The NG-RAN node may include multiple gNBs, which may also include a central unit (CU) (gNB-CU) 196 and distributed unit(s) (DUs) (gNB-DUs), of which DU 195 is shown. Note that the DU 195 may include or be coupled to and control a radio unit (RU). The gNB-CU 196 is a logical node hosting radio resource control (RRC), SDAP and PDCP protocols of the gNB or RRC and PDCP protocols of the en-gNB that control the operation of one or more gNB-DUs. The gNB-CU 196 terminates the F1 interface connected with the gNB-DU 195. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU 195 is a logical node hosting RLC, MAC and PHY layers of the gNB or en-gNB, and its operation is partly controlled by gNB-CU 196. One gNB-CU 196 supports one or multiple cells. One cell may be supported with one gNB-DU 195, or one cell may be supported/shared with multiple DUs under RAN sharing. The gNB-DU 195 terminates the F1 interface 198 connected with the gNB-CU 196. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memory(ies) 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU 195, and the one or more buses 157 could be implemented in part as, for example, fiber optic cable or other suitable network connection to connect the other elements (e.g., a central unit (CU), gNB-CU 196) of the RAN node 170 to the RRH/DU 195. Reference 198 also indicates those suitable network link(s).

It is noted that the description herein indicates that "cells" perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include location management functions (LMF(s)) and/or access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. Such core network functionality may include SON (self-organizing/optimizing network) functionality. These are merely example functions that may be supported by the network element(s) 190, and note that both 5G and LTE functions might be supported. The RAN node 170 is coupled via a link 131 to the network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, non-transitory memory, transitory memory, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, head mounted displays such as those that implement virtual/augmented/mixed reality, as well as portable units or terminals that incorporate combinations of such functions.

Accordingly, UE 110, RAN node 170, and/or network element(s) 190, (and associated memories, computer program code and modules) may be configured to implement (e.g. in part) the examples described herein, including spectral efficiency prediction with artificial intelligence for enhancing carrier aggregation and proactive radio resource management. Thus, computer program code 123, module 140-1, module 140-2, and other elements/features shown in FIG. 1 of UE 110 may implement user equipment related aspects of the examples described herein. Similarly, computer program code 153, module 150-1, module 150-2, and other elements/features shown in FIG. 1 of RAN node 170 may implement RAN/gNB/TRP related aspects of the examples described herein. Computer program code 173 and other elements/features shown in FIG. 1 of network element(s) 190 may be configured to implement network element related aspects of the examples described herein.

Having thus introduced a suitable but non-limiting technical context for the practice of the example embodiments, the example embodiments are now described with greater specificity.

In the context of 5G networks, carrier aggregation is a mandatory feature that should be performed in an intelligent manner, to enhance the quality of service provided to the UE and allow a smart usage of network resources.

Future releases may benefit from machine learning algorithms for enhancing the intelligence of the system and designing end-to-end solutions. Storage and learning may become possible in the RAN. The users (UEs) become more intelligent and information such as position becomes available at the UE side.

Carrier aggregation is one of the main ways for networks, such as 4G, 5G, and beyond, to allow a UE to make efficient use of carriers that may be in the same or different wireless spectrum bands. If carrier aggregation is used in an optimal way, it can enhance the network capacity as well as improve user experience.

Using carrier aggregation for a UE in a 3GPP (4G, 5G, etc.) network is a multi-step process.

During an RRC Connection to a Pcell, the UE establishes its RRC connection to the network via a first carrier known as a Pcell. The UE starts reporting certain channel measurements on the Pcell (CQI, Path loss, etc.) to the base station (aka RAN, or eNB/gNB) via the Pcell.

When adding/configuring an Scell, if multiple carriers are available, the base station first adds (or configures) one or more secondary cells (Scells) via an RRC protocol, providing configuration information that can help the UE to access the Scell at a later stage. However, the UE continues to report only channel measurements on the Pcell to the gNB (via PUCCH or PUSCH).

When activating an Scell, when the network decides that it is advantageous to transmit over one or more Scell(s), the gNB selects the one or more Scells to activate. The selected Scell(s) is/are activated by the gNB by sending an activation command (via a MAC control element, MAC-CE) to the UE.

The UE may have widely differing channel quality on the different candidate Scells. To select the best Scell to activate for a UE, gNB needs to know the channel quality of the UE on the different Scells. One metric of channel quality is the spectral efficiency of the UE's radio channel. In 3GPP networks, the UE reports to the base station channel state information that indicates the achievable spectral efficiency, including CQI (Channel Quality Indicator), RI (rank indicator), PMI (precoding matrix indicator), etc. In addition the UE may report beam information (especially in massive MIMO cells), and may send signals such as sounding reference signals (SRS) to the base station which may also be helpful in inferring the channel quality or spectral efficiency.

Spectral efficiency of the UE on candidate Scells is a crucial metric for accurate, efficient and optimal carrier aggregation decisions e.g. for selecting an appropriate Scell to activate.

An issue in carrier aggregation is that, the UE 110 can measure and report back to the gNB 170 the channel quality/spectral efficiency on the Scell only after the Scell is activated. Before activation, the UE only reports Pcell channel measurements to the RAN. Thus at the time the base station needs to select an Scell to activate, the RAN has no knowledge of the channel quality (e.g. spectral efficiency) of the UE's channel on the Scell.

One option would have been to simply keep the UE activated on all potential Scells all the time, so that the UE could then report the spectral efficiency on all possible Scells all the time. However this would cause an unnecessary drain on the UE's battery, and also consume unnecessary control channel resources. Therefore it is essential that the base station select an appropriate Scell to activate for the UE, and invoke such activation only when needed so as to avoid such unnecessary wastage. For this, it is crucial that the base station have an accurate prediction of the UE's spectral efficiency on candidate Scells, without having to keep the UE activated on all possible Scells just for the sake of getting channel state feedback.

Moreover, typically the UE has access to fairly rich information about its environment (e.g. via various measurements made by the UE) that the UE does not report back to the RAN: e.g. the UE typically has a GPS device that measures/determines the UE's location. Or, the UE can determine its location based on positioning reference signals transmitted by one or more base stations. The location of the UE can be a very significant input in predicting the spectral efficiency achievable by the UE (on different potential carriers, or forward-prediction in time). The UE also makes fast time-scale measurements e.g. L1 RSRP, DMRS-based channel estimation, CSI-RS and CSI-IM-based raw measurements, beam measurements including direction of arrival, relative measurements of multiple beams, timing and phase offset information, etc.

These measurements made by the UE are typically not reported back to the RAN for a variety of reasons (e.g. 1-3): 1) the base station currently has no use for such measurements; 2) the UE may not want to reveal certain sensitive information such as its location due to privacy concerns. Further, due to regulatory and security reasons, the RAN may not be allowed to have access to the UE location; 3) the capacity of the uplink control channel (e.g. PUCCH) that the UE would need to use to report such feedback/measurements is quite limited, therefore only a small amount of information can be reported by the UE back to the base station, and it would be impossible to transmit most of the rich information available at the UE to the base station.

In the light of the above, the technical problems to be solved are:

Problem 1: Determine how to enable the RAN to improve the prediction of the UE's spectral efficiency on candidate Scells for CA so as to optimally select Scell(s) for CA, by enabling the RAN to make use of measurements or information that are available at the UE but that would typically not be reported by the UE to the RAN.

Problem 2: Determine how to achieve the objective of Problem 1, while further ensuring that: the UE does not have to reveal to the base station sensitive information such as the UE's location, and the UE does not have to report a large amount of additional measurements back to the base station (to conserve control channel capacity).

An implementation in LTE and 5G, by the eNB and gNB respectively, involves the base station selecting an Scell using only the load on the Scell, without regard to the UE's channel quality on the Scell. However this is sub-optimal because the eNB/gNB may end up selecting an Scell to activate with very poor channel quality. As noted, the eNB/gNB does not get channel quality measurements unless the Scell is first activated.

Figure 2:
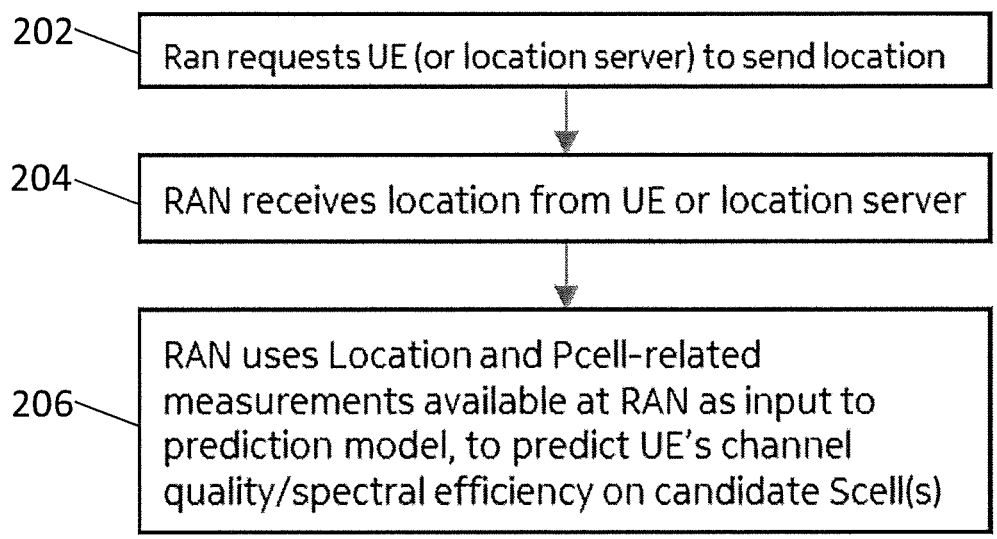
FIG. 2 illustrates a first method for predicting SCell spectral efficiency, based on the examples described herein.
Figure 3:
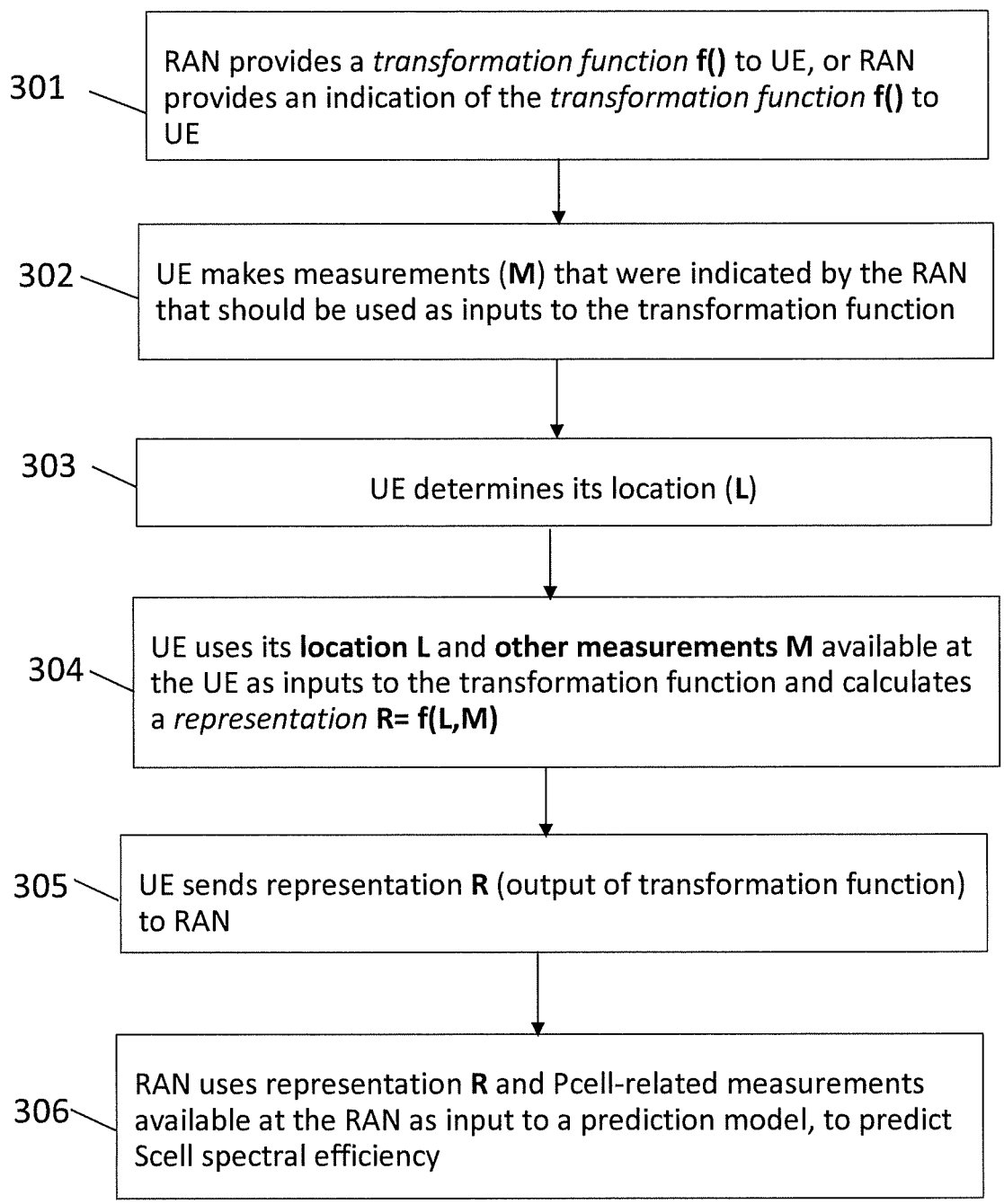
FIG. 3 illustrates a second method for predicting Scell spectral efficiency, where the second method is an enhancement to the first method.

Two methods are described herein, Method 1 (shown in FIG. 2) and Method 2 (shown in FIG. 3).

Method 1: The RAN (eNB/gNB, e.g. RAN node 170) receives the UE's (e.g. UE 110) location coordinates to the gNB (204), either by requesting it from the UE (202) or from a location server (e.g. SMLC). At 206, the UE's location is used as an additional input, along with Pcell-related channel measurements, to predict the UE's channel quality (e.g. spectral efficiency) on an Scell (or perform other predictive radio resource management actions) using a trained prediction model.

The intuition behind Method 1 is that the UE's location captures a lot of information about potential channel quality that the UE may experience on an Scell—essentially, different UEs with similar location are likely to experience similar channel quality. Therefore past experience with channel quality of UEs in a similar location can be used to train a prediction model that uses the UE's location as input and predicts Scell channel quality.

The drawbacks of Method 1 are that the UE's location may be considered as sensitive information, and it may be undesirable to reveal it to the RAN. Also, the RAN does not get to make use of other fast-time-scale measurements available at the UE. Due to this, the preferred approach is Method 2 described below.

Method 2 (enhancement of Method 1): At 301, the RAN (e.g. RAN node 170) provides to the UE (e.g. UE 110) a transformation function f( ) (which could be typically a machine learning (ML) model (preferred) e.g. a neural network, or which could be a non-ML-based function) whose inputs are the UE's location L and additional rich/fast time-scale measurements M that are available at the UE but not typically reported to the RAN. In some examples, the RAN may not provide the transformation function f( ) itself, but rather the RAN provides an indication of the transformation function f( ) such as the functional form of the transformation function or parameters of the transformation function. The RAN could select a transformation function from a pre-determined set of specified or standardized ones, and signal or indicate to the UE the selected choice of transformation function to the UE. The RAN can also select which parameters/measurements are suitable for use as inputs (M) to the transformation function in a given scenario and indicate those to the UE along with the transformation function. Additionally the RAN may indicate to the UE additional parameters necessary for computing the transformation function. These may be for example coefficients of various mathematical terms, or in the case where the transformation function is a neural network, these may be the number of layers, neurons in each layer, weights on the different layers and links between neurons, and activation functions at each neuron.

At 302, the UE makes measurements (M) that were indicated by the RAN that should be used as inputs to the transformation function. At 303, the UE determines its location (L).

At 304, the UE uses the transformation function f( ) to calculate a representation (or encoding) R=f(L,M), using its location L and other measurements M as input to f( ). At 305, the UE reports the representation R to the RAN. At 306, the RAN uses this representation along with additional measurements or metrics that are available at the RAN, such as Pcell-related measurements made by the RAN, to predict the Scell channel quality (or other predictive radio resource management actions) using a trained prediction model (e.g. ML model).

The additional measurements or metrics that are available at the RAN could include, for example, measurements (e.g. power or amplitude/phase) of the uplink SRS signals or DMRS or PUSCH signals transmitted by the UE (typically in the Pcell) and received at the RAN at one or more antenna ports or in one or more PRBs, the time difference or timing advance between the received signal from the UE and the intended start or end of a uplink reception slot according to the gNB's clock (typically in the PCell), the downlink beamforming weights that may have been used to transmit SSB beams or CSI-RS reference signals towards the UE (typically in the Pcell), activity factors or interference metrics for the activity of neighbor cells of the Pcell and/or the Scell, and the like.

The intuition behind Method 2 is that the transformation function f( ) captures the essential characteristics of the location and other measurements available at the UE—it is enough that the RAN knows the representation R for the purposes of predicting Scell spectral efficiency.

Method 2 overcomes the drawbacks of Method 1, because the RAN does not directly need to know sensitive information like location, and the UE does not need to report to the RAN the large amount of measurements available locally at the UE.

The transformation function f( ) itself could be a (suitably trained) neural network or other ML-based model, but could also be a non-ML-based function, e.g. based on a combination of rules and mathematical functions, or a combination of ML-based models and rules/mathematical functions, as long as a suitable set of location and channel measurements are considered as input.

For both methods (Method 1 and Method 2), there is a training phase where the model used for prediction of the Scell spectral efficiency at the RAN (or other predictive radio resource management actions) is trained using data collected from UEs for which the Scell has been activated. After activating an Scell (regardless of how the Scell to be activated was selected), the UE can actually measure and report the channel quality of the Scell, and thus after activation the RAN can get direct information about the channel quality of the Scell. Thus, in order to train the model for predicting the channel quality of the Scell, these Scell channel quality measurements provided by UEs for whom the Scell has been activated can be used. In method 1, the training data consists of input X=(Pcell measurements, UE location), true (or labeled) output Y=(Scell spectral efficiency for UE after activation). In method 2, the training data consists of input X=(Additional measurements available to the RAN (e.g. Pcell measurements made by RAN), UE-reported representation), and the true (or labeled) output Y=(Scell spectral efficiency for UE after activation))

Advantages of the methods and other examples described herein include (1-4): 1) enhanced accuracy of prediction of spectral efficiency; 2) near-optimal selection of the Scell for carrier aggregation, which in turn leads to: better system capacity due to efficient assignment of users to Scells, a better user experience due to higher throughputs and lower latency, better battery consumption for the UE, since fewer Scells are needed for delivering the UE's data due to the optimal selection of Scells, and better network KPIs since radio link failure issues can be avoided since CCs in bad radio conditions are not activated; 3) low overhead of feedback (as only the output of the transformation function needs to be reported, without a need to report all the rich measurements available at the UE); 4) protection of UE privacy (no need to reveal UE location to the base station).

The examples described herein may be implemented within a radio node, such as radio node 170, a 5G RAN gNB, or a 6G and beyond base station.

Figure 4:
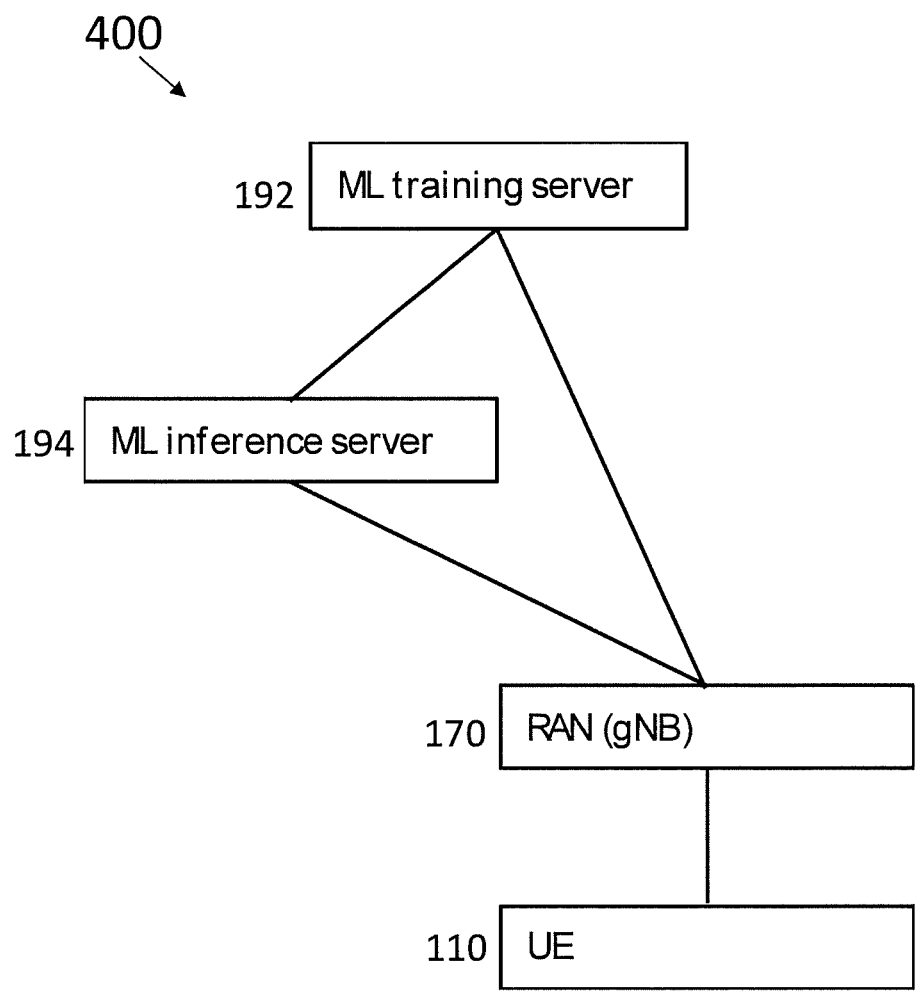
FIG. 4 shows the system architecture used for the examples described herein.

The system architecture used for the examples described herein is depicted in FIG. 4. For ML operations, training and inference may be done at different locations, represented as "training server" 192 and "inference server" 194 respectively. The ML inference server 194 can be either a functional module embedded in the RAN 170 itself, or a separate component outside of RAN 170. For example in the ORAN architecture, the ML inference server 194 could be at the "RIC-near-real-time", in which case the RAN could communicate with the RIC-near-real-time by means of an E2 interface for the purposes of obtaining a prediction of spectral efficiency for the Scell (or other predictive radio resource management action). The ML training server 192 can be either a functional module embedded in RAN 170 (which requires RAN 170 to have enough CPU power and data storage to train an ML model), or a separate component outside of RAN 170 (e.g. hosted at a central cloud, or in ORAN architecture, hosted at RIC-non-real-time).

The examples described herein address the problem of spectral efficiency prediction in the secondary cell for carrier aggregation by means of machine learning and by exploiting the location and other metrics available at the UE in a privacy-sensible way.

The examples described herein are based on using a "representation" of the UE's location and various other channel measurements made by the UE, as input for a machine learning prediction of the spectral efficiency in the SCell or a prediction/recommendation of the best candidate SCell.

The RAN can ask the UE to construct this representation (essentially a transformation of various UE metrics/measurements/attributes into a different coordinate space abstraction) and send this over to the RAN. Thus the UE does not necessarily have to send its actual location or detailed measurements, but merely sends the representation.

To facilitate this, the RAN can provide the UE a transformation function which the UE can use to compute the representation, and also provide to the UE a list of metrics/measurements which need to be made by the UE and used as input to the transformation function.

The UE then computes the transformation function on the specified inputs to obtain the representation i.e. the result of the transformation function, and sends it to the RAN.

The RAN then just uses that transformed representation as the input into a second ML-based prediction to enable proactive radio resource management. As an application, the representation can be used by the gNB together with other measurements available at the gNB (such as PCell-related measurements, which could include measurements of SRS or DMRS signals transmitted at the UE and received at the gNB, timing advance measurements, RACH signal strength measurements, interference measurements, any other measurements directly reported by the UE to the gNB such as Power Headroom (PHR) or channel quality indicator (CQI) or Rank Indicator (RI) or best beam indication or reference signal received power (RSRP) as input to an ML system (such as a neural network), which outputs a prediction of either the spectral efficiency of a UE on one or more candidate Scells (based on which the gNB can then pick a suitable Scell taking additional factors into account, such as the load on the Scells). In another application, the representation along with other measurements available at the RAN, as well as potentially other information, such as cell load of the PCell or Scell or their neighbor cells and/or the location of the transmission points of the Pcell and/or Scell, can be used as input to a ML system (such as a neural network) to directly predict/recommend the identity of the best Scell to configure/activate for a given UE under the input conditions. As another application, a vector or time series of the representations at multiple time instants may be used, instead of just the most recent representation reported by the UE, as input into any of the above predictions. As yet another application, the representations along with other measurements available at the RAN such as Pcell-related measurements (either the most recently reported ones, or a time-series or vector of values at multiple time instants) may be used to predict future channel conditions on the Pcell or already activated Scells, or on candidate Scells not yet activated. This can be used, for example, to predict the occurrence of poor channel conditions in the near future, based on which the RAN can proactively offload certain UEs to other cells, or proactively free up resources to better serve the UEs when poor channel conditions occur. In one example, the process can be applied to each of a group of UEs, for example, a group of UEs that are travelling together on a bus. By comparing the representations sent by multiple UEs, it is possible to identify that the channel evolution of UEs in a certain group are correlated, i.e. evolving in similar ways. It then becomes possible to predict, for example, that the entire group of UEs is likely to experience the onset of poor radio conditions. The RAN may then proactively take actions such as offloading all of the users to a different cell or carrier, or freeing up resources so that the whole group of users may be served better when the poor radio conditions occur.

The proposed method addresses a challenge that UE-based methods for predicting the Scell spectral efficiency (or other predictive radio resource management actions) as well as network-based methods on their own cannot address. If a UE-based method were to make a prediction of the Scell spectral efficiency using its location as well as the rich channel measurements on the Pcell, it would be still inaccurate because the achievable spectral efficiency on an Scell would depend on the interference received from neighbor cells of the Scell which are on the same carrier frequency as the Scell, and the interference cannot be measured by the UE without wasting effort actually measuring the Scell. On the other hand, the RAN would have access to the activity of the neighbor cells, but it cannot have access to the UE's location without forcing the UE to reveal its location, and the location is a component of getting an accurate prediction. The proposed method uses a combination of a UE-based aspect (calculation of a representation using the location and the rich channel measurements as input, and reporting it to the RAN), and a network-based aspect (determining the transformation function and providing it to the UE, and using a second ML-based model to predict the spectral efficiency of the Scell (or other predictive radio resource management aspect) using the UE-reported representation as input). Thus the proposed method overcomes the drawbacks that UE-based and network-based methods alone would have, and obtains the best of both worlds.

The transformation function f( ) may be provided once to the UE, and used by the UE multiple times to (e.g. periodically) provide the RAN with updated values of the representation as its location or channel conditions change.

The function f( ) can be provided by the RAN to the UE by RRC signaling or by MAC CE. The RAN could select a transformation function from a pre-determined set of specified or standardized functional forms, and signal the selected choice of transformation function to the UE along with requisite parameters needed to give a complete description of the transformation function to the UE.

Some candidate ways for the RAN to indicate the selected transformation function to the UE are as follows (i-iv immediately below):

i) A list of pre-defined functional forms (including ML-based and non-ML-based) can be standardized by 3GPP. The UE may indicate support of certain functional forms. The RAN selects a particular functional form, which may correspond to a specific index in the standardized list, and indicate the index in the list of the selected functional form to the UE. In addition, the RAN can indicate additional parameters/weights for the function that the UE may use together with the indicated functional form to obtain a complete description of the transformation function.

ii) One preferred embodiment of a transformation function is a neural network, wherein the form of the transformation function is a certain type of neural network. In order to provide the transformation function and additional parameters/weights to the UE, the RAN can indicate the architecture of the neural network and its hyperparameters, e.g.: (1) the type of neural network (2) the number of layers and the number of neurons in each layer (3) the weights and biases to be applied to each input of each neuron in each layer, (4) the choice of activation function at each layer (from among a pre-defined set of activation functions) (5) input normalization rules for the input layer, (6) quantization/precision of each input and output of the neural network, e.g. 8-bit integer or 16-bit floating point etc.

iii) Another embodiment of a transformation function can be a random forest. In this case, in order to provide the transformation function to the UE, the RAN can indicate the architecture of the forest (e.g. collection of trees), along with hyperparameters of the tree structures e.g. the maximum depth of a tree, a number of nodes at each depth, a degree of each node, and comparison thresholds to be applied at each node.

iv) In another embodiment, a non-ML form can be chosen by the RAN e.g. a combination of multiple mathematical functions to be applied in sequence. For example, a high-order polynomial followed by a function such as a scaled sigmoid which has a high slope in a certain region, followed by a quantizer. To provide the transformation function to the UE, the RAN can indicate the coefficients of the polynomial, the parameters of the scaled sigmoid, and the thresholds of the quantizer.

The RAN can also select which specific channel measurements M (along with the location L, which in an embodiment is a mandatory input) should be used as inputs to the transformation function in a given scenario and indicate those to the UE along with the transformation function.

The output of the representation R is typically a real number or a vector of real numbers, and can be simply encoded e.g. as 16-bit floating point numbers or as 8/16-bit integers, or merely as a single binary string, e.g. of 4-bit or 8-bit length. The output of the UE encoded in this way can be communicated to the RAN by e.g. MAC-CE (preferred) or by RRC signaling, or via PUCCH or PUSCH, for example in addition to (or alternatively, in replacement of) channel state information (CSI) like CQI/RI/PMI.

The second ML-based model for performing predictive radio resource management can itself be trained and deployed as follows. The embodiment below is for the case of predicting the spectral efficiency of a secondary cell for carrier aggregation, but essentially the same method can also be used for other predictive radio resource management. The ML-based model is trained using a training data set constructed as follows. For a given transformation function f( ), the RAN provides this transformation function to the UEs and gathers representations R from UEs based on the transformation function, and also observes the actual spectral efficiencies of the UEs for which Scells have been activated (so that the UE then measures and reports channel quality information for the Scell, from which the gNB can obtain the UE's achievable spectral efficiency). The training data set thus consists of the UE-reported representations as inputs, and the observed Scell spectral efficiencies as the 'label' for the training data, and the ML-based model for predicting Scell spectral efficiencies can be trained to minimize a suitable loss metric e.g. a squared error metric.

Figure 5:
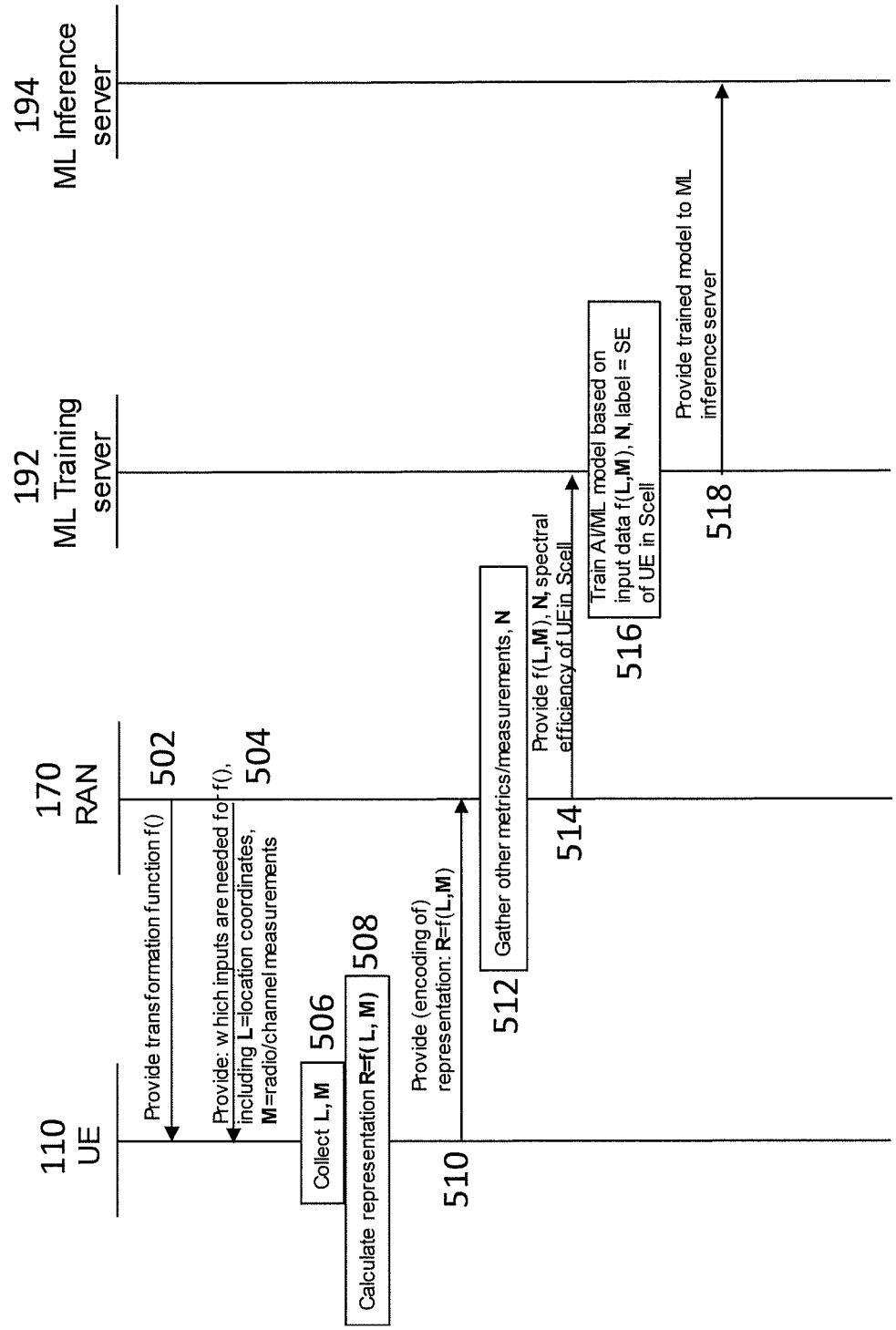
FIG. 5 is a signaling diagram showing the training phase, based on the examples described herein.

More precisely the method includes the following:

In the Training Phase, with Reference to FIG. 5:

I. At 502, the RAN 170 communicates to the UE 110 a transformation function, f( ). Details about this function and how the RAN communicates it to the UE are given as embodiments and examples described previously. For example as described previously herein, the RAN may communicate to the UE a selected transformation function type as an index into a pre-defined list of transformation function types, and further provide details of the additional parameters/weights necessary to give a complete description to the UE. For example, if the transformation function is a neural network, the RAN would communicate to the UE the type of neural network, as well as parameters such as the number of layers and neurons in each layer, and the weights/biases/activations to use at each neuron. Typical inputs to this function include L=the location of the UE (which could be expressed for example in terms of coordinates (x,y,z) or (longitude, latitude, altitude), or (distance, azimuth, elevation) relative to some known point, e.g. relative to the transmission point of the primary cell) of the UE, and M=radio channel measurements at the UE.

At 502, in some examples, the transformation function itself may not be transmitted—rather the RAN may transmit e.g. an index into a pre-specified/standardized list of functions, or may indicate a type of neural network, etc. Transmitting an indication of the transformation function may include transmitting an indication of additional parameters for the user equipment to use in computing the transformation function. The transmitted indication of additional parameters from the RAN to the UE may include, e.g., coefficients of various terms in the transformation function, or parameters of a neural network in case the transformation function is a neural network (NN).

II. At 504, the RAN communicates to the UE the metrics (e.g. inputs) to which this transformation function is applied. One of the metrics is the location of the UE, L=(x,y,z), which is some cases the location is a mandatory metric. Other inputs to the transformation function can include M=radio channel measurements made by the UE, such as instantaneous or time-averaged channel state information (CQI, rank, MIMO channel matrix, PMI, RSRP or RSRQ (including faster-time-scale L1 signal strength measurements, etc.). Thus the representation R can be viewed as R=f(L,M).

For example, regarding the measurements M made by the UE, if the UE has Pcell and Scells 1,2 active, and the goal is to now predict what would be the spectral efficiency on further candidate Scells, then measurements on not only the Pell but also the already activated Scells 1 and 2 can be obtained and used. Measurements are not necessarily made on those further candidate Scells that are being predicted—those Scells are typically not measurable because the UE is not listening to them.

III. (Optional) If necessary, the gNB communicates the values of some of these metrics, if they are not available at the UE side. This applies, for example if some values are parameters or measurements made at the gNB side rather than at the UE side.

IV. At 506, the UE 110 collects the required metrics. At 508, the UE 110 applies the transformation function to obtain (e.g. calculate) the representation R. At 510, the UE 110 sends the result of the calculation of the representation R to the gNB 170. Particularly, at 510 the UE 110 transmits an encoding of the calculated representation R=f(L,M).

V. The gNB 170 uses the reported representation R reported by the UE 110 as input for an ML system, along with possibly other inputs typically available at the gNB e.g. based on measurements N such as measurements made by the gNB or metrics obtained from neighbor cells, such as the activity of the neighbor cells who are intra-frequency neighbors of one or more secondary cells for the UE. During the training phase, the gNB typically conducts this operation of gathering (at 512) representations R=f(L,M) from a large number of UEs for which a secondary Cell is already selected, and for which the spectral efficiency of the UE on the Scell is known e.g. by CSI reporting from the UE after Scell activation. One of the labels of the data used as input in the training phase for the ML system is the spectral efficiency in the secondary cell. By using the values of the representation reported by UEs, along with other metrics/measurements available at the gNB, and the 'labels' as the observed spectral efficiency for UEs with Scells, the gNB can train the second ML-based model for example to minimize a loss function (e.g. a squared error) representing the inaccuracy between the predicted and observed spectral efficiencies. The gNB can then use this second ML-based model to predict the spectral efficiency of candidate Scells for further UEs based on the representation R they provide. Since the environment (e.g. channel propagation or mobility conditions or shadowing) within a cell may change over time, the gNB may repeat this process at certain intervals, or for example when it is detected that the predictions of the currently trained model no longer give sufficiently accurate predictions.

Accordingly, at 512, the RAN 170 gathers other metrics/measurements N such as measurements made by the gNB or metrics obtained from neighbor cells. At 514, the RAN 170 transmits to the ML training server 192 f(L,M), N, and the spectral efficiency of the UE in the Scell. At 516, the ML training server 192 trains the AI/ML model based on the input data f(L,M), N, and labels which are the spectral efficiency (SE) of the UE in the Scell. At 518, the ML training server 192 provides the trained model to the ML inference server 194.

Figure 6:
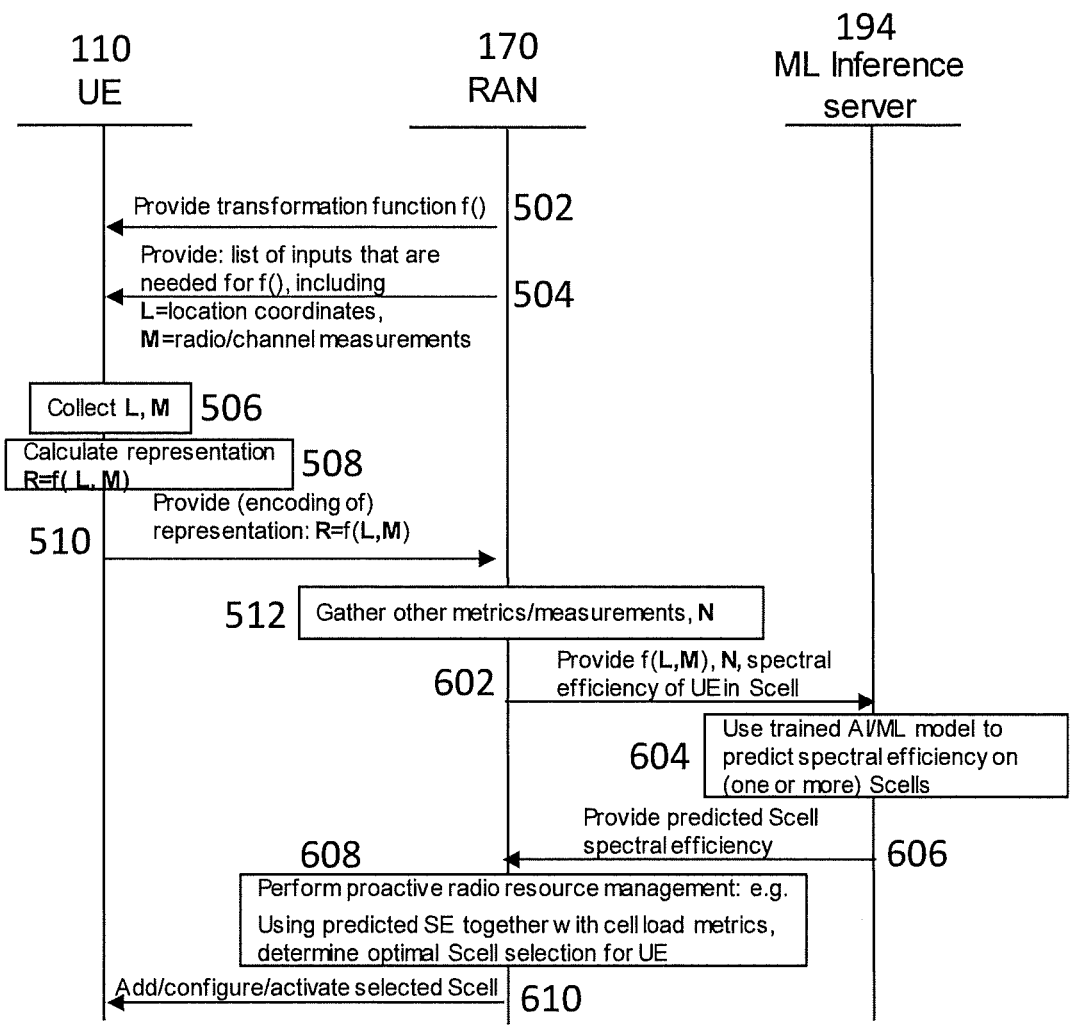
FIG. 6 is a signaling diagram showing the deployment phase, based on the examples described herein.

At the deployment time, with reference to FIG. 6, the ML system including the ML inference server 194 i.e. the second ML-based model for predicting the spectral efficiency of candidate Scells is already trained. At 602, the ML inference server 194 receives as input the computed result of the transformation function of a UE (e.g. UE 110) from the RAN 170, and at 606, the ML inference server 194 provides the gNB 170 a predicted spectral efficiency in a target secondary cell. The outcome of the predictor may be further used for proactive radio resource management such as selecting an Scell for activation (610).

Accordingly, as further shown in FIG. 6, at 602 the RAN 170 provides to the ML inference server 194 f(L,M), N, and the spectral efficiency of the UE in the Scell. At 604, the ML inference server 194 uses the trained AI/ML model to predict spectral efficiency on (one or more) Scells. At 606, the ML inference server 194 provides to the RAN 170 the predicted Scell spectral efficiency. At 608, the RAN 170 performs proactive radio resource management: e.g., using the predicted SE together with cell load metrics, the RAN 170 determines the optimal Scell selection for the UE 110. At 610, the RAN 170 adds, configures, or activates the selected Scell for the UE 110.

In another use of the methods and examples described herein, the result of the transformation function for each candidate SCell together with the candidate SCell load is fed to an AI/ML algorithm, such as a random forest classifier. The ML training system for the AI/ML algorithm or classifier is fed with the labels for the correct SCell to choose during the training phase, in order to train the model. During deployment, the trained classifier outputs a prediction/recommendation of the best SCell to choose for the UE, or a probability distribution over the candidate SCells. This process is depicted in FIG. 7.

Figure 7:
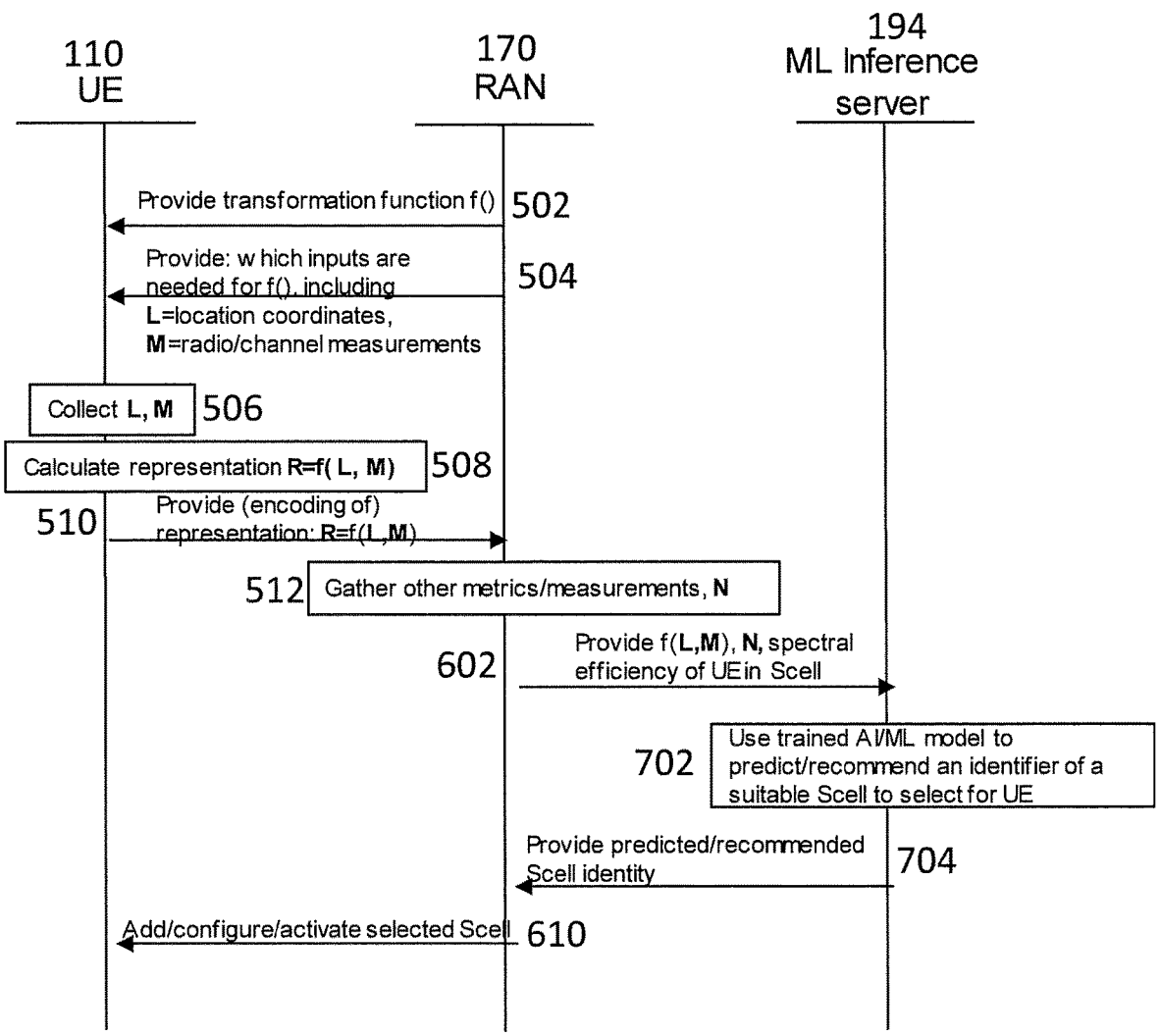
FIG. 7 is a signaling diagram showing a deployment phase for prediction/recommendation of an Scell, based on the examples described herein.

Accordingly, as further shown in FIG. 7, at 702 the ML inference server 194 uses the trained AI/ML model to predict/recommend an identifier of a suitable Scell to select for the UE 110. At 704, the ML inference server 194 provides the predicted/recommended Scell identity to the RAN 170.

Figure 8:
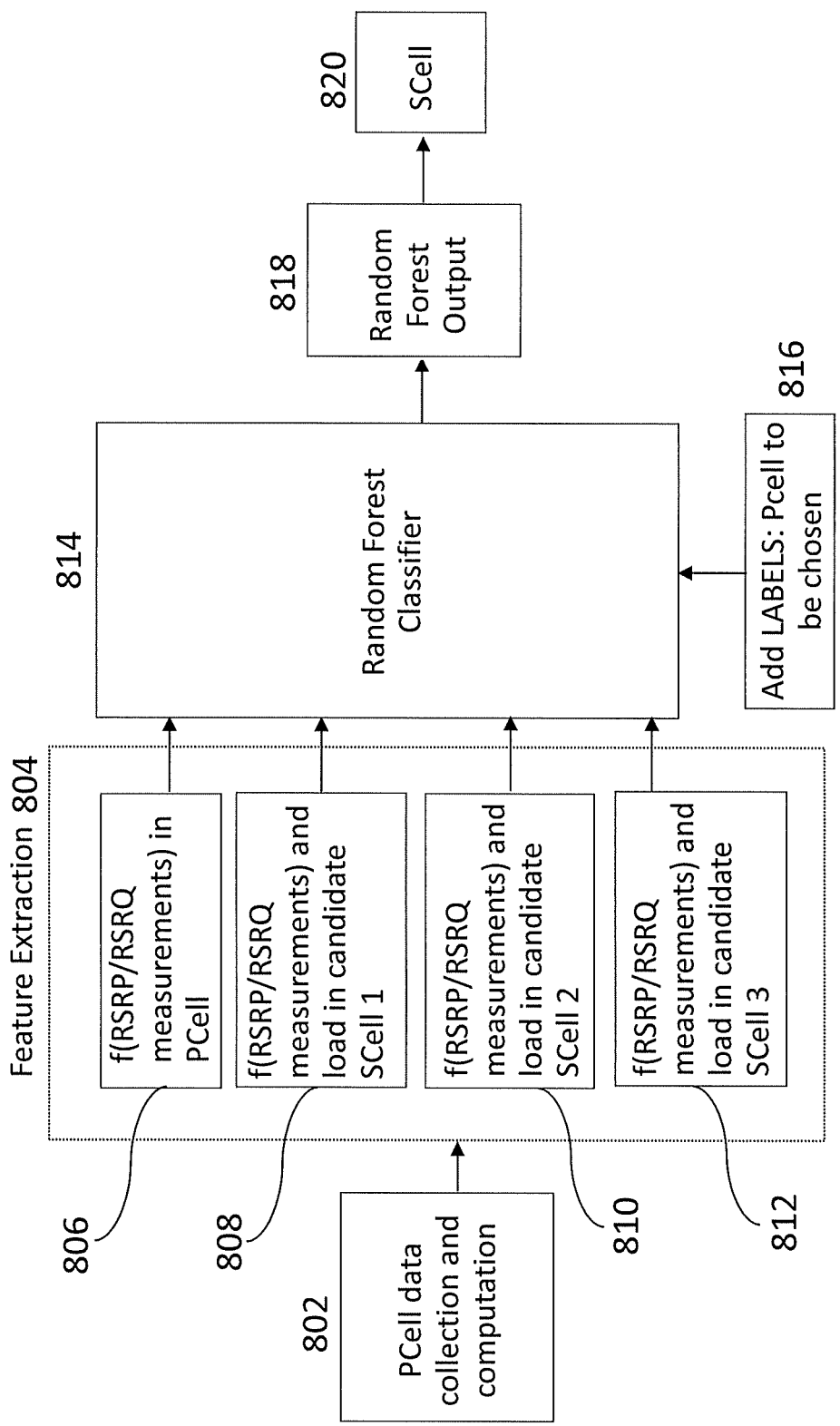
FIG. 8 depicts an algorithm architecture with several candidate SCells, where ML predicts or recommends an identity of an Scell to choose given the inputs.

Algorithmically, with reference to FIG. 8, the ML model may consist of a feature extraction phase 804, followed by a classifier 814 such as a random forest classifier that predicts/recommends a suitable SCell 820. The algorithm architecture is illustrated in FIG. 8.

As further shown in FIG. 8, an output of the PCell data collection and computation process 802 is provided to the feature extraction phase 804. The feature extraction phase 804 includes f(RSRP/RSRQ measurements) in the PCell 806, f(RSRP/RSRQ measurements) and load in candidate SCell 1 808, f(RSRP/RSRQ measurements) and load in candidate SCell 2 810, and f(RSRP/RSRQ measurements) and load in candidate SCell 3 812. As shown in FIG. 8, the output of each of processes 806, 808, 810, and 812 are provided to the random forest classifier 814. Process 816 includes adding labels related to the PCell to be chosen. The output of process 816 is provided to the random forest classifier 814. Random forest classifier 814 generates random forest output 818 used to predict or recommend a suitable SCell 820.

Accordingly, described herein is a method for predicting the spectral efficiency in a target secondary cell by using learning and user location, without disclosing the user location to the RAN. The method proceeds as follows.

The UE measures its location, which can be expressed in terms of coordinates L=(x,y,z) or any of the alternative representations such as (longitude, latitude, altitude), or (distance, azimuth, elevation) relative to some known point. The particular form to use for expressing location may be pre-agreed e.g. via standards forums, or can be indicated by the RAN to the UE.

The UE is given an indication by (e.g. configured by) the RAN, of which measurements to use as input to the transformation function. These measurements may comprise, for example, a set of n channel measurements, a vector M=(M1, M2, . . . , Mn). Accordingly, the UE makes these measurements and uses these as input to the transformation function along with the location L. These could be, for example:

M1=CQI or SINR (estimated by the UE)

M2=vector of beam IDs (in decreasing order of strengths)

M3=vector of received signal strengths of the different beams in M2 (or equivalently, path loss, assuming Tx power of the base station is known at the UE)

M4=vector of CQIs/PMIs of the different beams in M2

M5=vector of signal strengths of per-antenna received reference signal vectors etc., or a MIMO channel matrix (this could be a "raw" replacement of M2 and M3, with per-antenna measurements rather than per-beam measurements)

M6=L1-RSRP measured by the UE

M7=vector of synchronization signal (SS) or SS Block (SSB) signal received powers (or received powers per branch) for each UE antenna, for each of a number of resource elements in which the SS/SSB is received by the UE (which may include transmissions of multiple SSB beams)

M8=vector of synchronization signal (SS) or SS/PBCH Block (SSB) received interference powers for each of a number of resource elements in which the interference measurements corresponding to SS/SSB are made by the UE M9=vector of synchronization signal antenna phase of received signal for each receive antenna or receiver branch, for each of a number of resource elements that carry synchronization signals (SS or SS/PBCH)

M10=vector of CSI signal received powers (or amplitude/phase) of received signal for each UE receive antenna, for each of a number of resource elements in which CSI reference signals are received by the UE (which may include transmissions over multiple logical or physical gNB antenna ports)

M11=vector of received interference powers for each of a number of resource elements in which interference measurements are made by the UE M12=vector of positioning reference signal received powers (or amplitude/phase) for each of a number of resource elements in which positioning reference signals are received by the UE For any of the above measurements (including M1 through M12), the measurements could include either the vector of measurements made within a single slot (across multiple resource elements and/or multiple antenna ports or the like), or a series of vectors of measurements made across multiple slots or over a certain time interval.

Using L and M, the UE computes a representation R=f (L,M), where R=f(L,M) is the representation that the UE sends to the RAN.

Thus, the RAN does not need to know exactly what L or M were but it is sufficient that the RAN knows R.

The transformation function f( ) itself can be constructed as follows. The transformation function f( ) could be itself based on a machine learning algorithm, for example a neural network, or a hash function, etc. The transformation function f( ) provides a measure of hiding of the UE location from the RAN, or of dimensionality reduction wherein a large number of inputs (the rich channel measurements available at the UE) can be reduced down to a smaller number of dimensions that are most relevant. In this sense, it may take the form of an autoencoder.

A very desirable property is that this transformation f( ) should be locality-preserving, that is, if two inputs (L1,M1) and (L2,M2) are "close" to each other, then their representations R1=f(L1,M1) and R2=f(L2,M2) should be also "close" to each other. Most neural networks satisfy this, at least with continuous activation functions.

The RAN provides the transformation function f( ) to the UE (in this case, all UEs in a cell can be given the same f( ), but f( ) could be differently tuned for each cell). Starting with an initial transformation function f1( ), the RAN can iteratively refine the transformation function to arrive at a final transformation function f( ), for example as follows.

The RAN can select and iteratively refine the transformation function f( ) to be given to UEs in the following way. At the first step, the RAN uses a pre-trained initial transformation function e.g. a dimensionality-reduction function f1( ). For example, an ML-based transformation function may be used such as an auto-encoder which could be based on a neural network. This f1( ) could be for example obtained by training on a dataset of rich channel and location measurements made by test UEs, or from data gathered from a simulation of the expected environment in a cell.

The RAN provides this initial transformation function f1( ) to UEs, which calculate representations with the transformation function and report back the representations to the gNB. The RAN then uses these representations to make predictions of the spectral efficiency of the UEs on one or more candidate Scells using a second ML-based model for predicting the spectral efficiency, which is obtained by training as described earlier. After one or more Scells are actually activated for one or more UEs, the RAN is able to actually observe the true spectral efficiencies of the UEs on those Scells. Based on the accuracy of the spectral efficiency predictions compared to the true observed spectral efficiencies, the RAN can then modify (or update, or retrain) the function f1—e.g. by modifying the weights or number of neurons or other parameters, in the case where a neural-network was used—to obtain a new function f2( ), which captures either a larger number of dimensions (if the initial accuracy of the spectral efficiency was poor), or reduced number of dimensions (if the initial accuracy for the spectral efficiency was more than sufficiently good).

This new transformation function f2( ) can then be provided back to the UEs, etc., and the process may be repeated. This process of refining the transformation function may iteratively continue to produce further updates to the transformation function until a desired level of accuracy is reached. The RAN's function f( ) can be further tuned to ensure locality-preservation.

The process of updating the transformation function f( ) iteratively as described above, may be combined together with the process of updating/training the second ML-based model for predicting the Scell spectral efficiency (or other predictive radio resource management task). For example, starting with an initial transformation function f1( ) provided to a set of UEs, and observations gathered from the UEs, one can train an initial version of the second ML-based model for predicting Scell spectral efficiencies to minimize a loss metric (e.g. squared error) relative to the observed Scell spectral efficiencies. Then fixing this ML-based model at the gNB, the initial transformation function is refined to produce an updated transformation function f2( ). Then again providing f2( ) to the UEs to obtain updated representations and observations of their Scell spectral efficiencies, the second ML-based model is retrained to produce an updated prediction model for Scell spectral efficiencies. Fixing this model at the gNB, the transformation function f2( ) can be further updated to yield f3( ), and so on.

It is also possible to select a non-ML-based function to use as the transformation function, for example as a combination of rules or a combination of mathematical functions. One embodiment is to use a combination of mathematical operations to be applied in sequence to the input vector (L,M) which denotes the location of the UE and the rich channel measurements. For example, first a higher-order polynomial may be applied to the components of the input vector, and the result of the polynomial may be input to a function such as a piecewise-linear or nonlinear function that squeezes the range of the polynomial to a defined range such as the interval between −1 and +1. The output of the squeezing function may then be passed through a quantization stage to obtain the representation. The parameters of the transformation function in this case may include the coefficients of the polynomial, the thresholds and slopes/intercepts of the piecewise-linear function, and the quantizer thresholds. These may be selected according to e.g. a simulation model, or tuned from observations of the data following a process analogous to the ML-based process described above.

It is possible that the transformation function and/or the second ML-based model for predictive radio resource management actions may need up be updated from time to time, as radio propagation conditions may change, as may mobility patterns, shadowing and emergence of other propagation obstacles, and even the usage of directional beam patterns within a cell with massive MIMO to adapt to changing propagation and user/traffic distributions. To keep complexity manageable, the retraining processes described above should be kept as lightweight as possible. The beneficial part of the solution is that the implementation at the UEs is very lightweight, and most of the complexity is managed at the network side. To manage training complexity in an efficient way at the network side, one can make use of scalable/cloud-based frameworks which also provide automation capabilities such as software-defined pipelines that can automatically detect divergence of predictions from observations and trigger retraining when the divergence becomes sufficiently large. Furthermore, new platforms envisaged in forums such as ORAN can also be leveraged for this.

The process of constructing the transformation function above can be conducted entirely at the network side, and the UE does not need to know any details of how the RAN constructed or selected the transformation function. Thus from the perspective of standardization in 3GPP, the construction of the transformation function need not be standardized, and can be left to vendor implementation.

The output representation R received from the UE may be used by the RAN for proactive radio resource management in various ways, including (1-2 immediately below):

1a. To predict the spectral efficiency of the UE on a different carrier (e.g. a candidate Scell): based on a spectral efficiency prediction model S, which maps the representation R to a predicted spectral efficiency on the other carrier. By thus predicting the spectral efficiency of the UE for various candidate Scells, and by examining other metrics such as the cell load, the RAN can then determine a suitable Scell to configure/activate for the UE.

1b. (alternative to 1a) To obtain a prediction/recommendation of a suitable Scell for the UE, based on a suitably trained ML model which maps the representation R along with various metrics such as the cell loads into a recommendation of the Scell (or alternatively, a likelihood or goodness measure for the different candidate Scells).

2. To identify clusters of UEs that are "close" to each other i.e. likely to behave in similar ways as far as channel evolution in the near future: e.g. by using clustering algorithms on the representations R of various UEs. Further, the output representation R received from the UE may be used by the RAN for proactive radio resource management to predict the occurrence of poor channel conditions for a cluster of UEs—e.g. example of group of users on a bus which is going to enter a tunnel—all users hit poor coverage at the same time. By detecting UEs that are likely to approach poor channel conditions, the RAN can then take proactive measures such as handing off the UEs to a different cell or different carrier in anticipation of poor channel conditions on the current carrier/cell. Alternatively, the RAN can offload some other UEs to different cells, so as to free up resources that can then be used to serve the UEs which are approaching poor channel conditions.

The network entity (gNB or RAN LMF) stores this information locally and by means of machine learning creates a model by training ML models such as neural networks.

In one embodiment, during the training phase, one input is also the load of the target SCell.

During the training phase, in one embodiment, the label for the neural networks is the spectral efficiency of the UE in the target SCell after carrier aggregation.

In another embodiment, the ML algorithms such as neural networks are fed with the function computed for the UE in each of the candidate Scells. During the training phase, the input is also the correct SCell to be chosen.

One embodiment is implemented using random forest classifiers. In this embodiment, the transformation function is computed for each of the candidate SCells and inputted to the random forest classifier. The input for training the classifier contains the label with the correct SCell to be chosen (supervised training).

Figure 9:
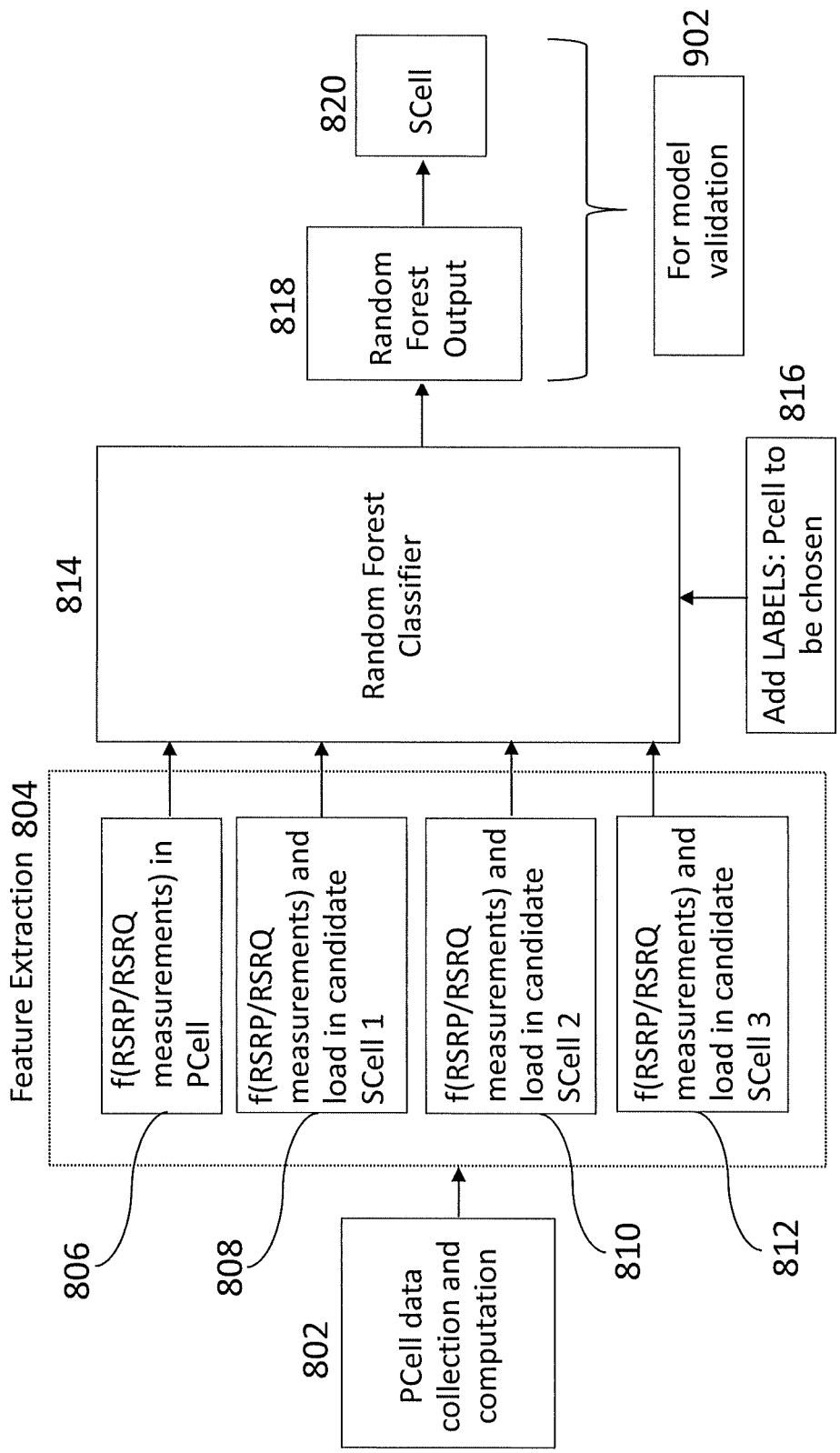
FIG. 9 depicts a system architecture for prediction of an Scell during model training.

FIG. 9 exhibits the system architecture during the model training. FIG. 9 resembles FIG. 8, and FIG. 9 highlights that the random forest output 818 and the predicted or recommended SCell 820 are used for model validation 902.

Described herein is a model training carried out by combining an exhaustive search over RFC parameter values, for the best number of trees and the best maximum depth of the trees. The training data represents 80% of the total amount of the data and the validation data represents 20% of the total amount of the data. The training uses 10-fold cross-validation procedure and two different metrics are used for evaluation in each iteration, the logarithmic loss and the F1 score. The best model is selected and used for validation, computation of the confusion matrix, precision, recall, F1 score and classification accuracy.

A confusion matrix, also known as an error matrix, is a specific table layout that allows visualization of the performance of an algorithm, typically a supervised learning one (in unsupervised learning it is usually called a matching matrix). Each row of the matrix represents the instances in a predicted class while each column represents the instances in an actual class (or vice versa). The name stems from the fact that it makes it easy to see if the system is confusing two classes (i.e. commonly mislabeling one as another).

Precision is the ability of the classifier not to label as positive a sample that is negative. Recall is the ability of the classifier to find all the positive samples.

The F-measure (Fβ and F1 measures) can be interpreted as a weighted harmonic mean of the precision and recall. A Fβ measure reaches its best value at 1 and its worst score at 0. With β=1, Fβ and F1 are equivalent, and the recall and the precision are equally important.

FIG. 9 shows that during the training phase, the random forest classifier 814 is at 816 fed with labels for the correct user transmitting (supervised learning). This is when the model is created. The random forest output block 818 and the SCell prediction block 820 are part of the system architecture during the training phase as well, in order to validate the trained model (model validation) at 902.

Figure 10:
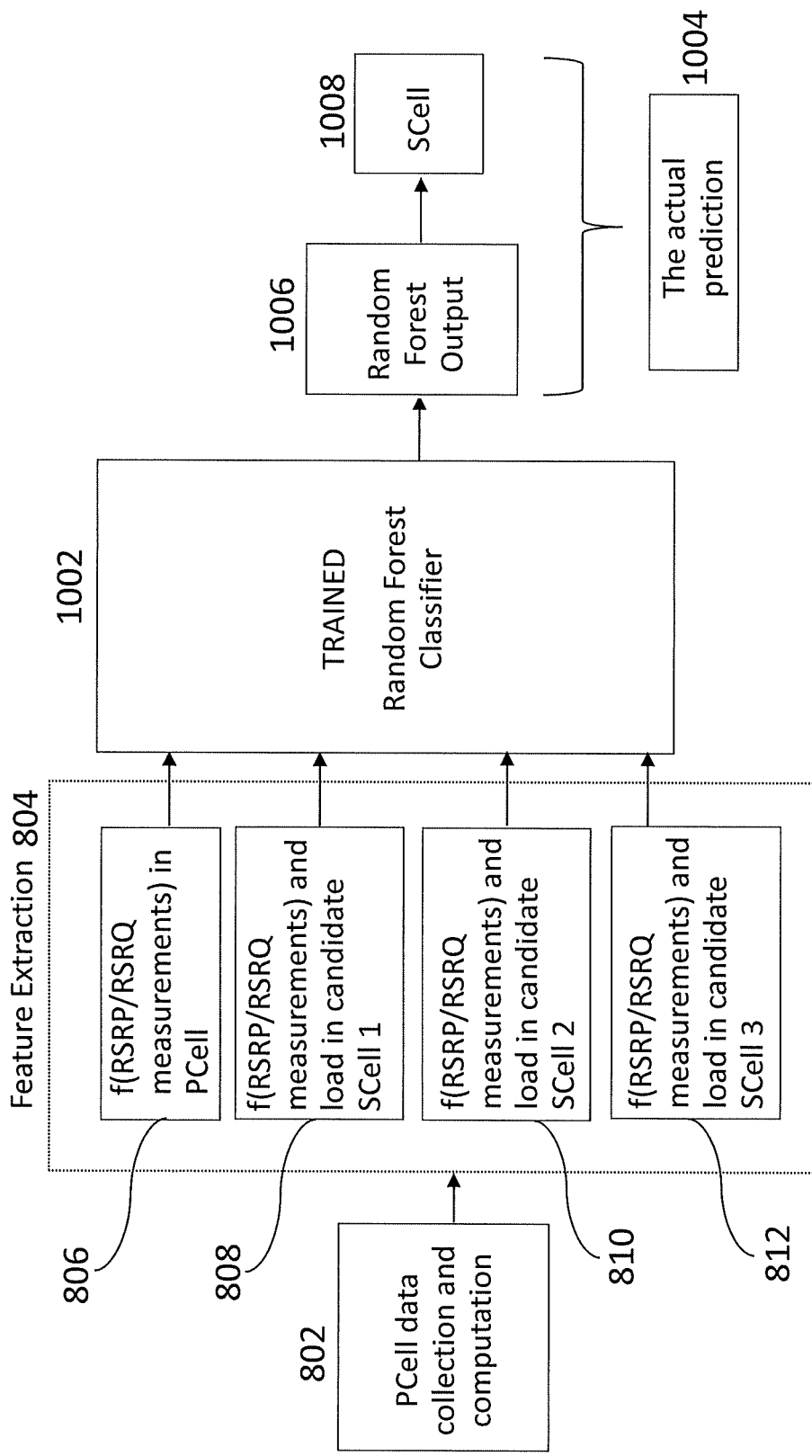
FIG. 10 depicts a system architecture for prediction of an Scell during deployment.

FIG. 10 exhibits the system architecture during deployment. The random forest classifier is already trained, thus the random forest classifier is designated as a trained random forest classifier 1002. Therefore no more labels are received as input and the random forest output block 1006 and the SCell decision block 1008 are used for their actual purpose, namely to determine an actual prediction 1004.

During deployment, the trained classifier 1002 outputs 1006 the SCell 1008 to be chosen or a probability distribution over the candidate SCells. Accordingly, FIG. 10 resembles the system architecture shown in FIG. 8 and FIG. 9, except FIG. 10 depicts the trained random forest classifier 1002 and the actual prediction 1004.

In one embodiment, the UE position may not be available, and the transformation function is computed with a flag.

Given that the network has learned from previous experiments, it can anticipate an upcoming low spectral efficiency on the SCell and proactively configure a lower traffic rate on the SCell and higher on the PCell.

In one embodiment, the examples described herein are used for groups of users as follows. The network can identify correlations/clusters of users whose spectral efficiency is evolving the same way and identify upcoming poor-coverage that might affect the whole group (similar to group handovers). Typically, within a cell a user may follow the same set of paths (streets etc.), so there may be a lot of correlation across users, for example users in buses, cars, trains, etc.

Based on this way of looking at groups of users and how their spectral efficiency evolves, it is also possible to look at the impact it has on the load of a cell.

The examples described herein may be used for a group of users as in the following scenario. A group of mobile users is experiencing a sudden drop of signal in the serving SCell (for example a bus entering a zone with blockages which causes a higher-band SCell's signal to drop under acceptable thresholds). For the entire group, the RAN may be forced to send more data to just a lower-band PCell instead of the SCell, generating a load spike on the PCell. Using the examples described herein, it is possible to proactively add some SCells for some other users (not the ones on the bus, but a different group of users) who might be otherwise just using the PCell, by invoking a prediction of those users' SE on candidate SCells. By adopting this strategy, the network offloads some of the existing load of those other users from the PCell, and thus frees up some capacity to handle the predicted oncoming load spike, etc. Essentially this is triggering a proactive load-balancing, but not because of predicting a load spike from a load time series as a conventional load-prediction might do but based on predicting the degradation of SE or RF conditions in another cell (Scell).

There are several advantages and technical effects of the examples described herein, including those related to CA Scell activation with ML-based spectral efficiency.

The described solution provides for selection of secondary CCs for activation among a certain number of configured CCs using ML. Benefits and further technical effects of this include improved spectral efficiency since the best CCs are selected for activation for given UEs, and low signaling overhead, as providing the transformation function to the UE is an infrequent occurrence. UEs are assigned the best secondary CCs with higher SE, that makes use of available resources optimally, consequently optimizing overall cell throughput. Further technical effects and benefits of the examples described herein include better battery utilization for the UE, since fewer optimal CCs can fulfill throughput requirements of the UE in comparison of more suboptimal CCs, and better KPIs since radio link failure issues can be avoided since CCs in bad radio conditions are not activated. This is particularly useful in case of inter-band CA, where assumption of similarity between radio conditions of the primary CC and secondary CCs becomes invalid.

A further technical effect of the examples described herein include CA Scell configuration with ML. Benefits of and technical effects of this include reduced latency since CCs are configured without any measurement reports from the UE, which means less signaling overhead as well. The examples described herein solve the issue of dynamic site configuration scenarios (e.g. power control ICIC, inter-cell interference coordination), where it might be very challenging to optimally define PCC and SCC combinations through static OAM configurations. The examples described herein take into account UE radio conditions in candidate secondary CCs as well as load conditions in candidate secondary CCs. In heavy site configuration scenarios, this becomes a complex combinatorial problem where ML is likely a suitable solution.

The herein described methods involve constructing a representation using both the UE's location and channel measurements. The RAN gets to use the UE location as an input, without having to worry about privacy issues about the user being made to reveal its actual location. Also, the RAN gets to use a rich set of channel measurements that are available at the UE but normally not reported to the RAN. Normally the UE can only report limited channel feedback to the RAN (e.g. best beam and CQI relative to that), due to limited uplink control channel capacity and battery life preservation, whereas the UE itself actually has a rich set of measurements available.

Since the herein described methods involve communication between the RAN and UE, the herein described methods may be standardized, for example for 3GPP Rel-18. Methods to facilitate use of ML for RAN are of high interest.

The function f( ) can be provided by the RAN to the UE by RRC signaling or by MAC CE. From a standards perspective, some candidate ways to accomplish this are: from a list of pre-defined functions to be standardized by 3GPP, a particular functional form is chosen (e.g. an index into a list of pre-defined functions), and parameters/weights for the function are communicated; or, a particular form (e.g. a neural network) is chosen, and parameters/hyperparameters (e.g. weights, number of layers, number of neurons in each layer, weights/bias, activation function, input normalization rule etc.) are communicated to the UE.

The output of the representation R is typically a real number or a vector of real numbers, and can be simply encoded e.g. as 16-bit floating point numbers or as 8/16-bit integers. The output of the UE encoded in this way can be communicated to the RAN by e.g. MAC-CE (preferred) or by RRC signaling.

Figure 11:
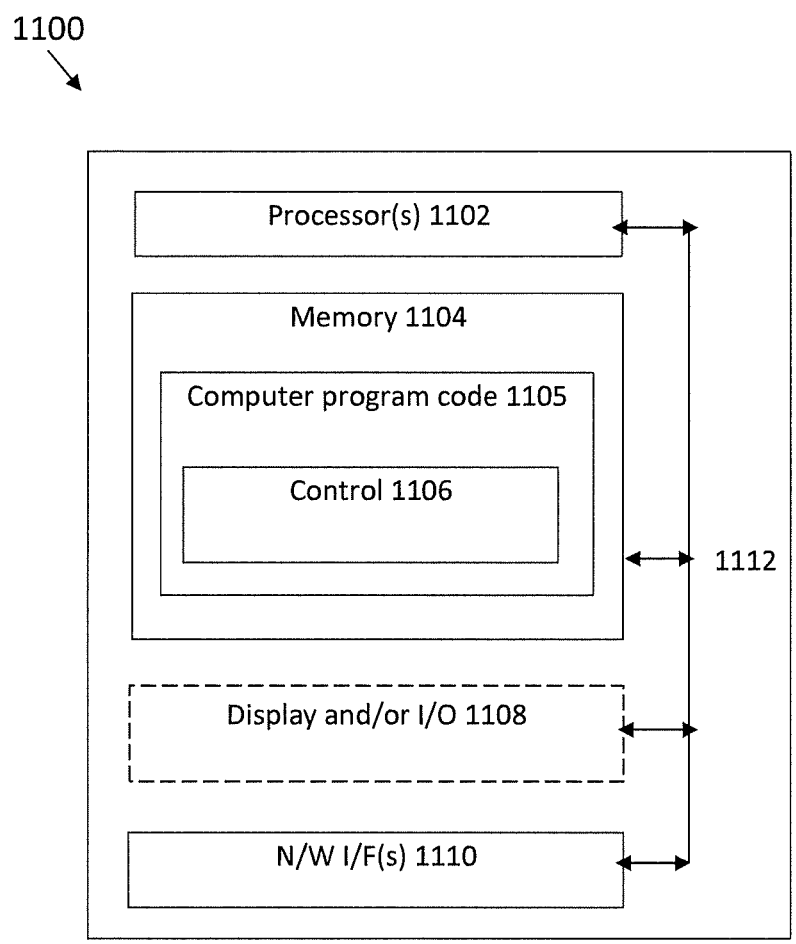
FIG. 11 is an example apparatus configured to implement the examples described herein.

FIG. 11 is an example apparatus 1100, which may be implemented in hardware, configured to implement the examples described herein. The apparatus 1100 comprises at least one processor 1102 (e.g., an FPGA and/or CPU), at least one memory 1104 including computer program code 1105, wherein at the least one memory 1104 and the computer program code 1105 are configured to, with at least one processor 1102, cause the apparatus 1100 to implement circuitry, a process, component, module, or function (collectively control 1106) to implement the examples described herein, including spectral efficiency prediction with artificial intelligence for enhancing carrier aggregation and proactive radio resource management. The memory 1104 may be a non-transitory memory, a transitory memory, a volatile memory, or a non-volatile memory.

The apparatus 1100 optionally includes a display and/or I/O interface 1108 that may be used to display aspects or a status of the methods described herein (e.g., as one of the methods is being performed or at a subsequent time), or to receive input from a user such as with using a keypad. The apparatus 1100 includes one or more network (N/W) interfaces (I/F(s)) 1110. The N/W I/F(s) 1110 may be wired and/or wireless and communicate over the Internet/other network(s) via any communication technique. The N/W I/F(s) 1110 may comprise one or more transmitters and one or more receivers. The N/W I/F(s) 1110 may comprise standard well-known components such as an amplifier, filter, frequency-converter, (de)modulator, and encoder/decoder circuitries and one or more antennas.

The apparatus 1100 to implement the functionality of control 1106 may be UE 110, RAN node 170, ML training server 192, ML inference server 194, network element(s) 190, or any of the other items depicted in FIGS. 1-10. Thus, processor 1102 may correspond respectively to processor(s) 120, processor(s) 152 and/or processor(s) 175, memory 1104 may correspond respectively to memory(ies) 125, memory(ies) 155 and/or memory(ies) 171, computer program code 1105 may correspond respectively to computer program code 123, module 140-1, module 140-2, or computer program code 153, module 150-1, module 150-2, or computer program code 173, and N/W I/F(s) 1110 may correspond respectively to the one or more transceivers 130, N/W I/F(s) 161, or N/W I/F(s) 180. Alternatively, apparatus 1100 may not correspond to either of UE 110, RAN node 170, or network element(s) 190, as apparatus 1100 may be part of a self-organizing/optimizing network (SON) node, such as in a cloud, or as mentioned, be or be part of ML training server 192 or ML inference server 194. The apparatus 1100 may also be distributed throughout the network 100 including within and between apparatus 1100 and any network element (such as a network control element (NCE) 190 and/or the RAN node 170 and/or the UE 110).

Interface 1112 enables data communication between the various items of apparatus 1100, as shown in FIG. 11. For example, the interface 1112 may be one or more buses such as address, data, or control buses, and may include any interconnection mechanism, such as a series of lines on a motherboard or integrated circuit, fiber optics or other optical communication equipment, and the like. Computer program code 1105, including control 1106 may comprise object-oriented software configured to pass data/messages between objects within computer program code 1105. The apparatus 1100 need not comprise each of the features mentioned, or may comprise other features as well.

Figure 12:
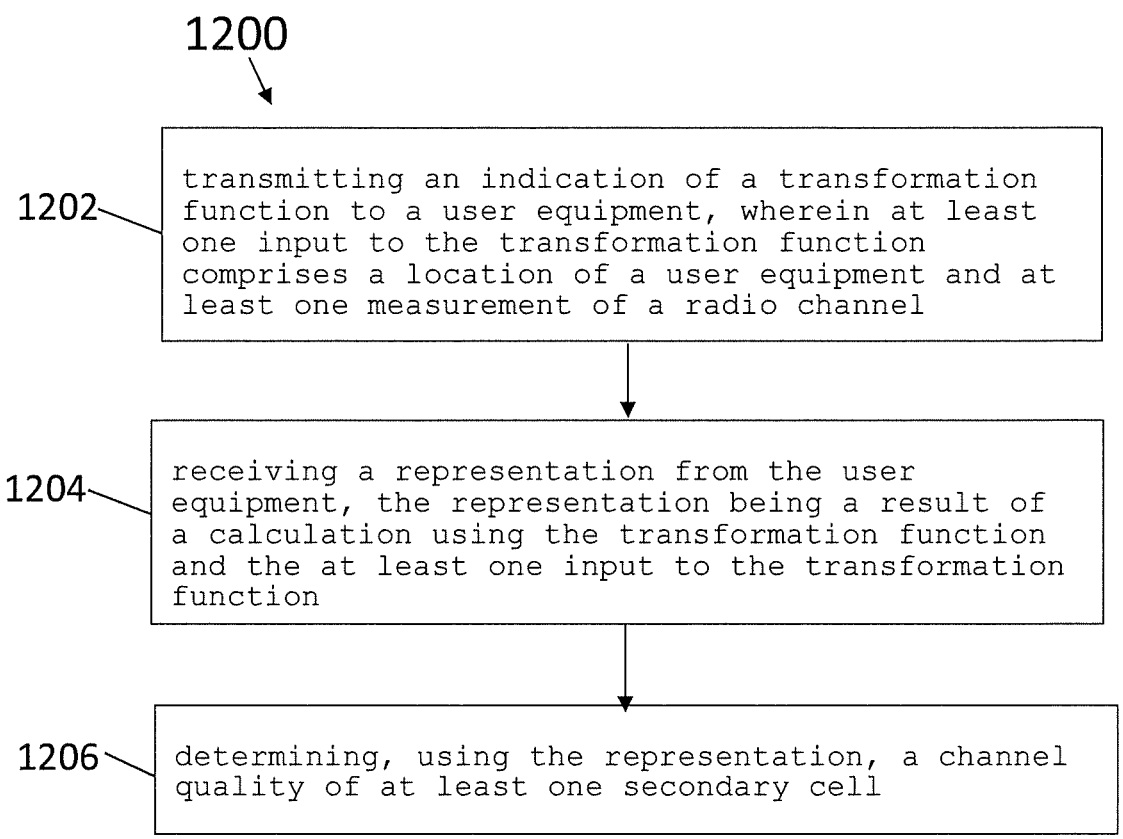
FIG. 12 is an example method to implement the examples described herein.

FIG. 12 is an example method 1200 to implement the example embodiments described herein. At 1202, the method includes transmitting an indication of a transformation function to a user equipment, wherein at least one input to the transformation function comprises a location of a user equipment and at least one measurement of a radio channel. At 1204, the method includes receiving a representation from the user equipment, the representation being a result of a calculation using the transformation function and the at least one input to the transformation function. At 1206, the method includes determining, using the representation, a channel quality of at least one secondary cell. Method 1200 may be performed with RAN node 170 (e.g. a gNB in 5G or equivalent structure in future standardizations), apparatus 1100, or a combination of those.

Figure 13:
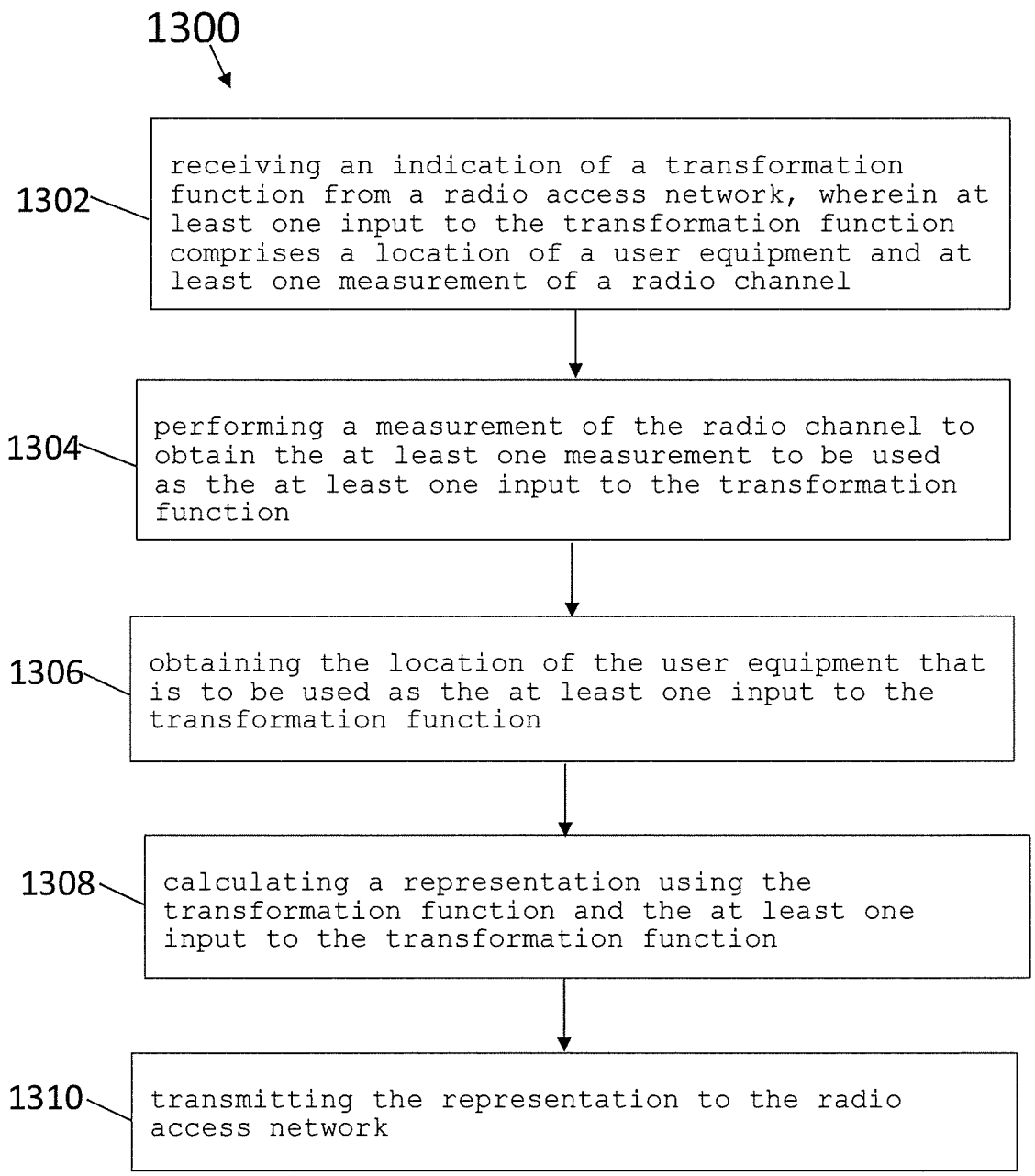
FIG. 13 is an example method to implement the examples described herein.

FIG. 13 is an example method 1300 to implement the example embodiments described herein. At 1302, the method includes receiving an indication of a transformation function from a radio access network, wherein at least one input to the transformation function comprises a location of a user equipment and at least one measurement of a radio channel. At 1304, the method includes performing a measurement of the radio channel to obtain the at least one measurement to be used as the at least one input to the transformation function. At 1306, the method includes obtaining the location of the user equipment that is to be used as the at least one input to the transformation function. At 1308, the method includes calculating a representation using the transformation function and the at least one input to the transformation function. At 1310, the method includes transmitting the representation to the radio access network. Method 1300 may be performed with UE 110, apparatus 1100, or a combination of those.

References to a 'computer', 'processor', etc. should be understood to encompass not only computers having different architectures such as single/multi-processor architectures and sequential or parallel architectures but also specialized circuits such as field-programmable gate arrays (FPGAs), application specific circuits (ASICs), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The memory(ies) as described herein may be implemented using any suitable data storage technology, such as semiconductor based memory devices, flash memory, magnetic memory devices and systems, optical memory devices and systems, non-transitory memory, transitory memory, fixed memory and removable memory. The memory(ies) may comprise a database for storing data.

As used herein, the term 'circuitry' may refer to the following: (a) hardware circuit implementations, such as implementations in analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. As a further example, as used herein, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

The following examples 1-25 are provided herein among the disclosed examples.

Example 1: An apparatus includes at least one processor; and at least one non-transitory memory including computer program code; wherein the at least one memory and the computer program code are configured to, with the at least one processor, cause the apparatus at least to: transmit an indication of a transformation function to a user equipment, wherein at least one input to the transformation function comprises a location of a user equipment and at least one measurement of a radio channel; receive a representation from the user equipment, the representation being a result of a calculation using the transformation function and the at least one input to the transformation function; and determine, using the representation, a channel quality of at least one secondary cell.

Example 2: The apparatus of example 1, wherein the channel quality of the at least one secondary cell is determined using a machine learning model trained using data collected from a plurality of user equipments for which the at least one secondary cell has been activated.

Example 3: The apparatus of any of examples 1 to 2, wherein the at least one memory and the computer program code are further configured to, with the at least one processor, cause the apparatus at least to: select the at least one secondary cell for the user equipment for carrier aggregation using the determined channel quality of the at least one secondary cell.

Example 4: The apparatus of any of examples 1 to 3, wherein the determined channel quality of the at least one secondary cell is used for radio resource management.

Example 5: The apparatus of any of examples 1 to 4, wherein the location of the user equipment and the at least one measurement of the radio channel is not received from the user equipment.

Example 6: The apparatus of any of examples 1 to 5, wherein the at least one memory and the computer program code are further configured to, with the at least one processor, cause the apparatus at least to: transmit an indication of which specific measurement is to be used as the at least one measurement of the radio channel which is to be used as the at least one input to the transformation function.

Example 7: The apparatus of any of examples 1 to 6, wherein the representation received from the user equipment comprises an encoded representation.

Example 8: The apparatus of any of examples 1 to 7, wherein the transformation function is a machine learning model.

Example 9: The apparatus of any of examples 1 to 8, wherein the channel quality of the at least one secondary cell is further determined using at least one of: a load of the at least one secondary cell; at least one primary cell measurement of a primary cell made by the apparatus; activity of neighboring cells of the at least one secondary cell; activity of neighboring cells of the primary cell; or locations of transmission points of the primary cell and the at least one secondary cell.

Example 10: The apparatus of any of examples 1 to 9, wherein the at least one memory and the computer program code are further configured to, with the at least one processor, cause the apparatus at least to: accumulate training data, wherein the training data comprises: a plurality of representations determined using the transformation function from a plurality of user equipments for which respective secondary cells have been selected; at least one measurement determined with the radio access network; and respective spectral efficiencies of the plurality of user equipments on the respective secondary cells, the respective spectral efficiencies being labels for the training data.

Example 11: The apparatus of example 10, wherein the at least one memory and the computer program code are further configured to, with the at least one processor, cause the apparatus at least to: train a machine learning model using the training data.

Example 12: The apparatus of any of examples 10 to 11, wherein the at least one memory and the computer program code are further configured to, with the at least one processor, cause the apparatus at least to: provide the training data to a machine learning training server; and receive a trained machine learning model from the training server.

Example 13: The apparatus of any of examples 1 to 12, wherein transmitting the indication of the transformation function comprises transmitting an indication of parameters for the user equipment to use for computing the transformation function.

Example 14: An example apparatus includes at least one processor; and at least one non-transitory memory including computer program code; wherein the at least one memory and the computer program code are configured to, with the at least one processor, cause the apparatus at least to: receive an indication of a transformation function from a radio access network, wherein at least one input to the transformation function comprises a location of a user equipment and at least one measurement of a radio channel; perform a measurement of the radio channel to obtain the at least one measurement to be used as the at least one input to the transformation function; obtain the location of the user equipment that is to be used as the at least one input to the transformation function; calculate a representation using the transformation function and the at least one input to the transformation function; and transmit the representation to the radio access network.

Example 15: The apparatus of example 14, wherein the representation is configured to be used to determine, with a machine learning model, a channel quality of at least one secondary cell.

Example 16: The apparatus of any of examples 14 to 15, wherein the location of the user equipment and the at least one measurement of the radio channel is not reported to the radio access network.

Example 17: The apparatus of any of examples 14 to 16, wherein the at least one memory and the computer program code are further configured to, with the at least one processor, cause the apparatus at least to: receive an indication of which specific measurement is to be used as the at least one measurement of the radio channel which is to be used as the at least one input to the transformation function.

Example 18: The apparatus of any of examples 14 to 17, wherein the at least one memory and the computer program code are further configured to, with the at least one processor, cause the apparatus at least to: encode the representation; wherein the representation that is transmitted to the radio access network comprises the encoded representation.

Example 19: The apparatus of any of examples 14 to 18, wherein the transformation function is a machine learning model.

Example 20: An example method includes receiving an indication of a transformation function from a radio access network, wherein at least one input to the transformation function comprises a location of a user equipment and at least one measurement of a radio channel; performing a measurement of the radio channel to obtain the at least one measurement to be used as the at least one input to the transformation function; obtaining the location of the user equipment that is to be used as the at least one input to the transformation function; calculating a representation using the transformation function and the at least one input to the transformation function; and transmitting the representation to the radio access network.

Example 21: An example method includes transmitting an indication of a transformation function to a user equipment, wherein at least one input to the transformation function comprises a location of a user equipment and at least one measurement of a radio channel; receiving a representation from the user equipment, the representation being a result of a calculation using the transformation function and the at least one input to the transformation function; and determining, using the representation, a channel quality of at least one secondary cell.

Example 22: An example apparatus includes means for transmitting an indication of a transformation function to a user equipment, wherein at least one input to the transformation function comprises a location of a user equipment and at least one measurement of a radio channel; means for receiving a representation from the user equipment, the representation being a result of a calculation using the transformation function and the at least one input to the transformation function; and means for determining, using the representation, a channel quality of at least one secondary cell.

Example 23: An example apparatus includes means for receiving an indication of a transformation function from a radio access network, wherein at least one input to the transformation function comprises a location of a user equipment and at least one measurement of a radio channel; means for performing a measurement of the radio channel to obtain the at least one measurement to be used as the at least one input to the transformation function; means for obtaining the location of the user equipment that is to be used as the at least one input to the transformation function; means for calculating a representation using the transformation function and the at least one input to the transformation function; and means for transmitting the representation to the radio access network.

Example 24: An example non-transitory program storage device readable by a machine, tangibly embodying a program of instructions executable with the machine for performing operations is provided, the operations comprising: transmitting an indication of a transformation function to a user equipment, wherein at least one input to the transformation function comprises a location of a user equipment and at least one measurement of a radio channel; receiving a representation from the user equipment, the representation being a result of a calculation using the transformation function and the at least one input to the transformation function; and determining, using the representation, a channel quality of at least one secondary cell.

Example 25: An example non-transitory program storage device readable by a machine, tangibly embodying a program of instructions executable with the machine for performing operations is provided, the operations comprising: receiving an indication of a transformation function from a radio access network, wherein at least one input to the transformation function comprises a location of a user equipment and at least one measurement of a radio channel; performing a measurement of the radio channel to obtain the at least one measurement to be used as the at least one input to the transformation function; obtaining the location of the user equipment that is to be used as the at least one input to the transformation function; calculating a representation using the transformation function and the at least one input to the transformation function; and transmitting the representation to the radio access network.

It should be understood that the foregoing description is only illustrative. Various alternatives and modifications may be devised by those skilled in the art. For example, features recited in the various dependent claims could be combined with each other in any suitable combination(s). In addition, features from different embodiments described above could be selectively combined into a new embodiment. Accordingly, this description is intended to embrace all such alternatives, modifications and variances which fall within the scope of the appended claims.

When a reference number as used herein is of the form y-x, this means that the referred to item is an instantiation of (or type of) reference number y or, for example if reference number y alone does not exist, a common or similar entity. For example, module 140-1 and module 140-2 in FIG. 1 are instantiations of (e.g. a first and second instantiation) of a common or similar computer program code entity.

In the figures, lines represent couplings and arrows represent directional couplings or direction of data flow in the case of use for an apparatus or system, and lines represent couplings and arrows represent transitions or direction of data flow in the case of use for a method or signaling diagram.

The following acronyms and abbreviations that may be found in the specification and/or the drawing figures are defined as follows (acronyms may be appended together or with other characters or numbers, e.g. by using a dash/hyphen ("-") or using parentheses ("( )")):

3GPP third generation partnership project
4G fourth generation
5G fifth generation
5GC 5G core network
6G sixth generation
AI artificial intelligence
AMF access and mobility management function
ASIC application-specific integrated circuit
CA carrier aggregation
CE control element
CC component carrier
CPU central processing unit
CQI channel quality indicator
CSI channel state/status information
CU central unit or centralized unit
DMRS demodulation reference signal
DSP digital signal processor
DU distributed unit
eNB evolved Node B (e.g., an LTE base station)
EN-DC E-UTRA-NR dual connectivity
en-gNB node providing NR user plane and control plane protocol terminations towards the UE, and acting as a secondary node in EN-DC
E-UTRA evolved universal terrestrial radio access, i.e., the LTE radio access technology
F1 interface between the CU and the DU in the context of an NG communication network, or the F1 score (harmonic mean of the precision and recall) in the context of ML
FPGA field-programmable gate array
gNB base station for 5G/NR, i.e., a node providing NR user plane and control plane protocol terminations towards the UE, and connected via the NG interface to the 5GC
GPS global positioning system
HW hardware
ICIC inter-cell interference coordination
I/F interface
IM interference measurement, e.g. CSI-IM
I/O input/output
KPI key performance indicator
L1 layer 1, where layer 1 is a physical layer
LMF location management function
LTE long term evolution (4G)
MAC medium access control
MIMO multiple-input multiple-output
ML machine learning
MME mobility management entity
NCE network control element
ng or NG new generation
ng-eNB new generation eNB
NG-RAN new generation radio access network
NN neural network
NR new radio (5G)
N/W network
OAM operations, administration and maintenance
ORAN open radio access network
PCC primary component carrier
Pcell or PCell primary cell
PDA personal digital assistant
PDCP packet data convergence protocol
PHR power headroom report
PHY physical layer
PMI precoding matrix indicator
POC proof of concept
PRB physical resource block
PUCCH physical uplink control channel
PUSCH physical uplink shared channel
RACH random access channel
RAN or Ran radio access network, or a base station
Rel release
RF radio frequency
RFC random forest classifier
RI rank indicator
RIC RAN intelligent controller or radio intelligent controller
RLC radio link control
RRC radio resource control (protocol)
RRH remote radio head
RS reference signal
RSRP reference signal receive power
RSRQ reference signal receive quality
RU radio unit
Rx receive or receiver or reception
SCC secondary component carrier
Scell or SCell secondary cell
SE spectral efficiency
SGW serving gateway
SINR signal-to-interference-plus-noise ratio
SMLC serving mobile location center
SRS sounding reference signal(s)
SON self-organizing/optimizing network
SSB synchronization signal block
TRP transmission and/or reception point
Tx transmit or transmitter or transmission
UE user equipment (e.g., a wireless, typically mobile device)
UPF user plane function
X2 network interface between RAN nodes and between RAN and the core network
Xn network interface between NG-RAN nodes

What is claimed is:

1. An apparatus comprising:
 at least one processor; and
 at least one non-transitory memory storing instructions that, when executed by the at least one processor, cause the apparatus at least to:
 transmit an indication of a transformation function to a user equipment, wherein at least one input to the transformation function comprises a location of the user equipment and at least one measurement of a radio channel;

receive a representation from the user equipment, the representation comprising a result of a calculation using the transformation function and the at least one input to the transformation function;

wherein the result of the calculation using the transformation function comprises at least one value different from values associated with the location of the user equipment, and different from values associated with the at least one measurement of the radio channel, wherein the at least one value comprises a transformation of the values associated with the location of the user equipment and the at least one measurement of the radio channel; and determine, based on the representation and primary cell related measurements, a channel quality of at least one secondary cell or an identity of at least one secondary cell.

2. The apparatus of claim 1, wherein the channel quality of the at least one secondary cell is determined using a machine learning model trained using data collected from a plurality of user equipments for which the at least one secondary cell has been activated, wherein the data comprises results of calculations using the transformation function, and a previously known channel quality of a secondary cell.

3. The apparatus of claim 1, wherein the instructions, when executed by the at least one processor, cause the apparatus at least to:

select the at least one secondary cell for the user equipment for carrier aggregation using the determined channel quality of the at least one secondary cell;

wherein the channel quality of the at least one secondary cell is determined using a machine learning model trained at least using results of calculations performed by at least one user equipment using the transformation function, and a previously known channel quality of a secondary cell; and transmit, to the user equipment, a configuration comprising the selected at least one secondary cell for the user equipment for carrier aggregation.

4. The apparatus of claim 1, wherein the determined channel quality of the at least one secondary cell is used for radio resource management.

5. The apparatus of claim 1, wherein the location of the user equipment and the at least one measurement of the radio channel are not within the representation received from the user equipment, the representation comprising the result of the calculation using the transformation function and the at least one input to the transformation function.

6. The apparatus of claim 1, wherein the instructions, when executed by the at least one processor, cause the apparatus at least to:

transmit an indication of which specific measurement is to be used as the at least one measurement of the radio channel which is to be used as the at least one input to the transformation function.

7. The apparatus of claim 1, wherein the representation comprising the result of the calculation using the transformation function received from the user equipment comprises an encoded representation having less data than the at least one measurement of the radio channel or the location of the user equipment.

8. The apparatus of claim 1, wherein the transformation function is a machine learning model.

9. The apparatus of claim 1, wherein the channel quality of the at least one secondary cell is further determined using at least one of:

a load of the at least one secondary cell;

at least one primary cell measurement of a primary cell made by the apparatus;

activity of neighboring cells of the at least one secondary cell;

activity of neighboring cells of the primary cell; or locations of transmission points of the primary cell and the at least one secondary cell.

10. The apparatus of claim 1, wherein the instructions, when executed by the at least one processor, cause the apparatus at least to:

accumulate training data, wherein the training data comprises:

a plurality of representations determined using the transformation function, the transformation function using user equipment location as input, from a plurality of user equipments for which respective secondary cells have been selected;

at least one measurement determined with the radio access network; and respective spectral efficiencies of the plurality of user equipments on the respective secondary cells, the respective spectral efficiencies being labels for the training data.

11. The apparatus of claim 10, wherein the instructions, when executed by the at least one processor, cause the apparatus at least to:

train a machine learning model using the training data.

12. The apparatus of claim 10, wherein the instructions, when executed by the at least one processor, cause the apparatus at least to:

provide the training data to a machine learning training server; and receive a trained machine learning model from the training server.

13. The apparatus of claim 1, wherein transmitting the indication of the transformation function comprises transmitting an indication of parameters for the user equipment to use for computing the transformation function.

14. The apparatus of claim 1, wherein the instructions, when executed by the at least one processor, cause the apparatus at least to;

transmit, from a radio access network node to an inference server, the representation comprising the result of the calculation using the transformation function, wherein the apparatus comprises the radio access network node; and receive, with the radio access network node from the inference server, based on the representation comprising the result of the calculation using the transformation function, the channel quality of the at least one secondary cell or the identity of the at least one secondary cell.

15. The apparatus of claim 1, wherein the instructions, when executed by the at least one processor, cause the apparatus at least to:

determine at least one measurement performed with the apparatus or received from cells neighboring the apparatus, wherein the apparatus comprises a radio access network node; and transmit, to an inference server, the at least one measurement performed with the apparatus or received from cells neighboring the apparatus;

receive, from the inference server, the channel quality of the at least one secondary cell or the identity of the at least one secondary cell;

wherein the r channel quality of the at least one secondary cell or the identity of the at least one secondary cell received from the inference server is based on the at least one measurement performed with the apparatus or received from cells neighboring the apparatus.

16. An apparatus comprising:

at least one processor; and at least one non-transitory memory storing instructions that, when executed by the at least one processor, cause the apparatus at least to:

receive, from a radio access network, a representation comprising a result of a calculation using a transformation function and at least one input to the transformation function;

wherein at least one input to the transformation function comprises a location of a user equipment and at least one measurement of a radio channel;

wherein the result of the calculation using the transformation function comprises at least one value different from values associated with the location of the user equipment, and different from values associated with the at least one measurement of the radio channel, wherein the at least one value comprises a transformation of the values associated with the location of the user equipment and the at least one measurement of the radio channel;

determine, based on the representation and primary cell related measurements, a channel quality of at least one secondary cell or an identity of at least one secondary cell; and transmit, to the radio access network, the channel quality of the at least one secondary cell or the identity of the at least one secondary cell.

* * * * *